United States Patent [19]

Burke

[11] 3,840,382

[45] Oct. 8, 1974

[54] SILICA PIGMENT AND ELASTOMER-SILICA PIGMENT MASTERBATCHES AND PRODUCTION PROCESSES RELATING THERETO

[76] Inventor: Oliver W. Burke, 1510 S.W. 13th Ct. P.O. Box 2266, Fort Lauderdale, Fla. 33061

[22] Filed: July 17, 1972

[21] Appl. No.: 269,784

Related U.S. Application Data

[60] Continuation-in-part of Ser. Nos. 216,948, Jan. 11, 1972, Pat. No. 3,700,690, and Ser. No. 55,458, July 16, 1970, Pat. No. 3,686,113, and Ser. No. 55,459, July 16, 1970, Pat. No. 3,686,219, and Ser. No. 55,479, July 16, 1970, Pat. No. 3,694,398, said Ser. No. 216,948, is a continuation-in-part of Ser. No. 55,384, July 16, 1970, abandoned, and Ser. No. 55,476, July 16, 1970, abandoned, said Ser. No. 55,458, and Ser. No. 55,459, and Ser. No. 55,479, and Ser. No. 55,384, and Ser. No. 55,476, each is a continuation-in-part of Ser. No. 798,215, Sept. 16, 1968, abandoned, which is a division of Ser. No. 611,250, Jan. 24, 1967, Pat. No. 3,523,096, which is a continuation-in-part of Ser. No. 458,420, May 24, 1965, abandoned, and Ser. No. 458,379, May 24, 1965, abandoned, and Ser. No. 479,806, Aug. 16, 1965, Pat. No. 3,401,017.

[52] U.S. Cl....... 106/288 B, 106/308 N, 106/308 F, 106/308 Q, 106/307, 260/33.6 AO
[51] Int. Cl.......................... C08c 11/10, C08d 9/00
[58] Field of Search........ 106/288 Q, 288 B, 308 N, 106/308 F, 308 Q; 260/33.6 AO

[56] References Cited

UNITED STATES PATENTS

| | | | |
|---|---|---|---|
| 2,663,650 | 12/1953 | Iler................................ | 106/308 Q |
| 3,392,140 | 7/1968 | Moahs et al........................ | 260/41.5 |
| 3,686,219 | 8/1972 | Burke.............................. | 106/308 N |
| 3,686,220 | 8/1972 | Burke.............................. | 106/308 N |

*Primary Examiner*—Delbert E. Gantz
*Assistant Examiner*—J. V. Howard
*Attorney, Agent, or Firm*—Hall & Houghton

[57] ABSTRACT

As indicated at (A) through (D-6) of the drawings, the invention first produces an aqueously wet silica pigment composition (D-1) which in the embodiments is treated with oleophilic material (B) and/or reactant (C). The so treated compositions (D-1) are suitable for masterbatching with elastomer in solvent dispersion (E)-(FIG. 1) or aqueous dispersion (E')-(FIG. 2) with or without prior reduction or removal of free water (D-2). The silica pigment composition (D-2) is blended (at D-3) with carbon black pigment and/or processing oil (M) and, with adjusted water content, these combinations are formable into pigment beads (via D-4, D-5, D-6). The overall process curbs the losses of pigments in the masterbatching and promotes uniformity of product, The silica pigment compositions (D-1), and especially (D-3) when beaded, constitute pigment materials useful for the compounding of rubber.

11 Claims, 2 Drawing Figures

SILICA PIGMENT AND ELASTOMER-SILICA PIGMENT MASTERBATCHES AND PRODUCTION PROCESSES RELATING THERETO

CROSS REFERENCE TO RELATED APPLICATIONS

This application is a continuation-in-part of the following five copending applications:

| Serial No. | Filed | Case No. | Patent No. |
|---|---|---|---|
| 216,948 | Jan. 11, 1972 | 48DM-2A CIP | 3,700,690 |
| 55,458 | July 16, 1970 | 48DM-2Q | 3,686,113 |
| 55,459 | July 16, 1970 | 48DM-3 | 3,686,219 |
| 55,479 | July 16, 1970 | 48DM-12 | 3,694,398 |
| 55,384 | July 16, 1970 | 48DM-13 abandoned | | the said application Ser. No. 216,948 having been a continuation-in-part of the following two applications

| 55,384 | July 16, 1970 | 48DM-13 now abandoned |
| 55,476 | July 16, 1970 | 48DM-2A, now abandoned | and all of said applications filed July 16, 1970 being continuations-in-part of application

| 798,215 | Sept. 16, 1968 | 48DM Div. 1 now abandoned | itself a division of application

| 611,250 | Jan. 24, 1967 | 48DM now Patent No. 3,523,096 | which in turn was a continuation-in-part of earlier applications

| 458,420 | May 24, 1965 | 48D now abandoned |
| 458,379 | May 24, 1965 | 48C now abandoned |
| 479,806 | Aug. 16, 1965 | 48E, now Patent No. 3,401,017 | the disclosures of all of which are incorporated herein by reference.

BACKGROUND OF THE INVENTION

1. Field of the Invention

The field to which this invention pertains is the preparation of unique silica pigment compositions which may be employed in the forming of masterbatches of such unique silica pigment compositions of elastomers and other polymeric materials.

2. Description of the Prior Art

It is well known in the art that attempts to make masterbatches from elastomer latex and aqueously dispersed hydrated silica pigment by latex masterbatching have resulted in loss of large amounts of the hydrated silica pigment in the mother liquor and in non-uniform masterbatches, and that even the addition of tetraethylenepentamine (Whitby, Synthetic Rubber, John Wiley & Sons, Inc., New York, 1954, page 676) or glue, gelatin or casein (U.S. Pat. No. 2,616,860) has not provided a satisfactory solution to this problem. Also, to applicant's knowledge there is not at the present time any elastomer-silica masterbatch being offered on the commercial market, nor have the unique silica pigment compositions and modes of preparing the same, provided by this invention, heretofore been known.

SUMMARY OF THE INVENTION

Figure 1:
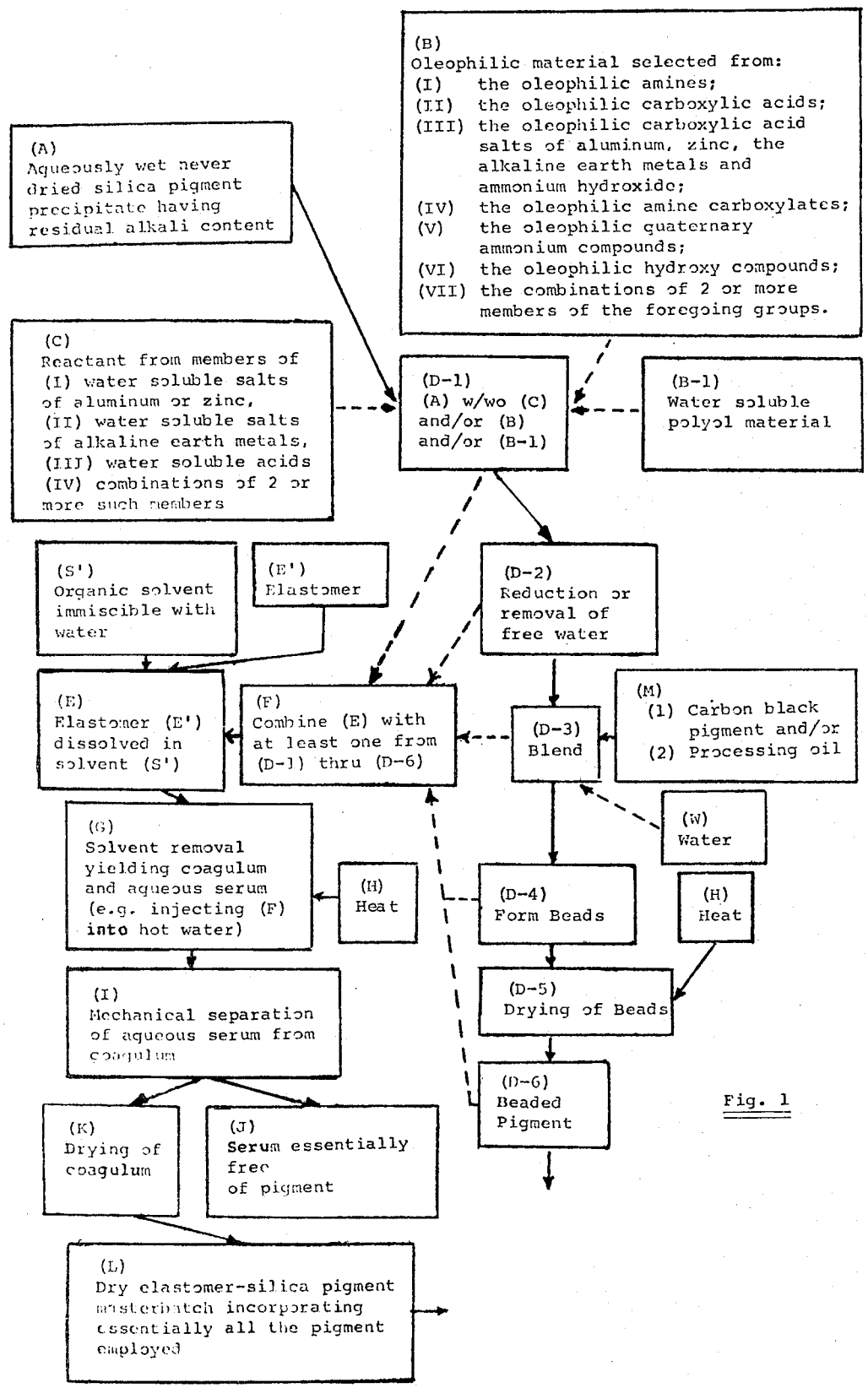
FIGS. 1 and 2 of the drawings are block-diagrams illustrative of the process aspects of the invention, with the overall process applied to the preparation of the pigment compositions and masterbatching thereof with elastomers in solvent and aqueous dispersions, respectively.

It is known to those skilled in the art to prepare hydrated silica pigment for the reinforcement of rubber by precipitation from aqueous solutions of alkali metal silicates with the aid of carbon dioxide, and to carry out such precipitation in manners to avoid the formation of gelatinous masses—(i.e., the formation of silica gel)—and to promote the precipitation of a silica pigment in finely divided form (i.e., in particles in the reinforcing size range of about 0.015 to about 0.150 microns, preferably 0.02 to 0.06 microns) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10 percent by weight as $Na_2O$, and upon being dried in this state form aggregates, from the pigment particles of reinforcing size, which aggregates are of much greater than reinforcing size and will not adequately disperse (i.e., break down into particles of reinforcing size) when incorporated into rubber either by dry compounding or latex compounding.

When one treats such alkaline wet silica pigments with water soluble salts of alkaline earth metals, e.g., calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g., avoiding loss of pigment in the serum in wet masterbatching) and adequate dispersion of the pigment in the elastomer in particles of reinforcing size (e.g., minimizing the pigment aggregation problem); and the present invention provides a process for accomplishing these ends by forming the masterbatch from aqueously wet hydrated silica pigment precipitates having a bound alkali content of 0.1 to 10 percent by weight as $Na_2O$; which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus, the present invention, inter alia, provides a simple and efficient process for the curbing of silica pigment losses and the promotion of uniformity of product in the preparation of masterbatches of measured silica pigment content. As shown in the drawing, the first part of the process comprises the steps of:

A. providing 5 to 75 parts by weight, dry basis, of aqueously wet hydrated silica pigment precipitate which has a bound alkali content in the range of 0.1 to 10 percent by weight as $Na_2O$; which has been prepared by precipitation from an aqueous solution of alkali-metal silicate with the aid of carbon dioxide; and which has continuously been maintained in an aqueously wet state without having been dried therefrom after its precipitation;

B. providing a quantity of from 0.1 to 20 percent by weight, based on the silica pigment (A) dry basis, of oleophilic material selected from the members of Groups (I) through (VII) set forth at (B) in the drawing, and in more detail hereinafter;

C. providing reactant material selected from the class consisting of the members of Groups (I) through (IV) set forth in (C), and in more detail hereinafter;

D. combining the wet silica pigment—from (A)—with or without oleophilic material—from (B)—, and from 0 to at least a stoichiometric equivalent, based on the alkalinity of the silica pigment, dry basis, of reactant—from (C)—, thereby to form an aqueously wet silica pigment composition (D-1). The silica pigment composition so provided, particularly when it contains the oleophilic material from (B), may be dried to yield useful dispersible dry silica pigment compositions as indicated at (D-2), or may be used without drying, e.g. in the second part of the masterbatching process, by process routes (E) to (L)-(FIG. 1) or (E') to (L')-(FIG. 2), hereinafter described.

The silica pigment compositions (D-1) with or without (B) and/or (C), together with from 0 to 10 percent based on the silica pigment, dry weight, of water soluble polyol material (B-1), may have its content of water reduced as indicated at (D-2), e.g., by drying, pressing, centrifuging, or mixing with previously prepared dry silica pigment, and may be blended (at D-3) with at least 5 percent by weight, based on the pigment, of carbon black and/or processing oil e.g. in the ratio of about 5 to 75 parts silica pigment (D-2) dry basis, by weight to about 5 to 75 parts carbon black and/or about 5 to 45 percent by weight of processing oil (M), based on the combined weight of silica and carbon black, and the water having been adjusted, as aforesaid by addition of water (W), to approximately equal the weight of the non-aqueous part of the blend (D-3), i.e., in the range of about ½ to 1¾ parts of aqueous phase per part of non-aqueous phase, so as to permit beading, the composition may be beaded in any suitable beading device, e.g., a laboratory beader, of the low shear cake mixer type, or in some instances, in a high shear Waring blender, or in others in such blender followed by the low shear beading, or in a commercial beading equipment, e.g. as described in Glaxner Reissue Patent No. 21,379 dated Mar. 5, 1940, and the resulting pigment beads (D-4) may be dried (D-5) to produce a beaded pigment (D-6) useful for the rubber trade.

In its presently most preferred embodiments the beading process comprises, in combination:

a. providing—at (A)—10 weight parts, dry basis, of aqueously wet hydrated silica pigment precipitate which has a bound alkali content in the range of 0.1 to 10 percent by weight as $Na_2O$; which has been prepared by precipitation from an aqueous solution of alkali metal silicate with the aid of carbon dioxide; and which has continuously been maintained in an aqueously wet state without having been dried therefrom after its precipitation;

b. providing—at (M)—from 0 to 150 weight parts, dry basis, of carbon black;

c. providing—at (M)—from 0 to 45 percent based on the total of (a) and (b) dry basis, by weight of processing oil;

d. replacing—at (D-1)—from 0 to 100 percent of the alkalinity of the wet pigment provided in (a) by reaction with reactant selected from the class consisting of the members of the following groups: Group (I) the water soluble salts of aluminum or zinc; Group (II) the water soluble salts of alkaline earth metals; Group (III) the water soluble acids; Group (IV) combinations of 2 or more members selected from Groups (I), (II) or (III);

e. combining with said wet pigment (A) from 0 to 2 parts by weight of oleophilic material selected from the class consisting of the members of the following groups: (I) the oleophilic amines; (II) the oleophilic carboxylic acids; (III) the oleophilic carboxylic acid salts of aluminum, zinc, the alkaline earth metals, and ammonium hydroxide; (IV) the oleophilic amine carboxylates; (V) the oleophilic quaternary ammonium compounds; (VI) the oleophilic hydroxy compounds; (VII) the combinations of 2 or more members of the foregoing groups; and from 0 to 1 parts of polyol dry basis by weight—from (B-1)—, to provide a silica pigment for use in steps (D-2) to (D-6);

f. mixing—at (D-3)—the pigment provided by step (D-1) with at least ½ part of material selected from the group consisting of (b), (c) and (e) in the presence of sufficient water to enable beading of the mixture (said quantity being adjusted as aforesaid), and g. beading and drying the composition so formed—at (D-4) and (D-5).

Figure 2:
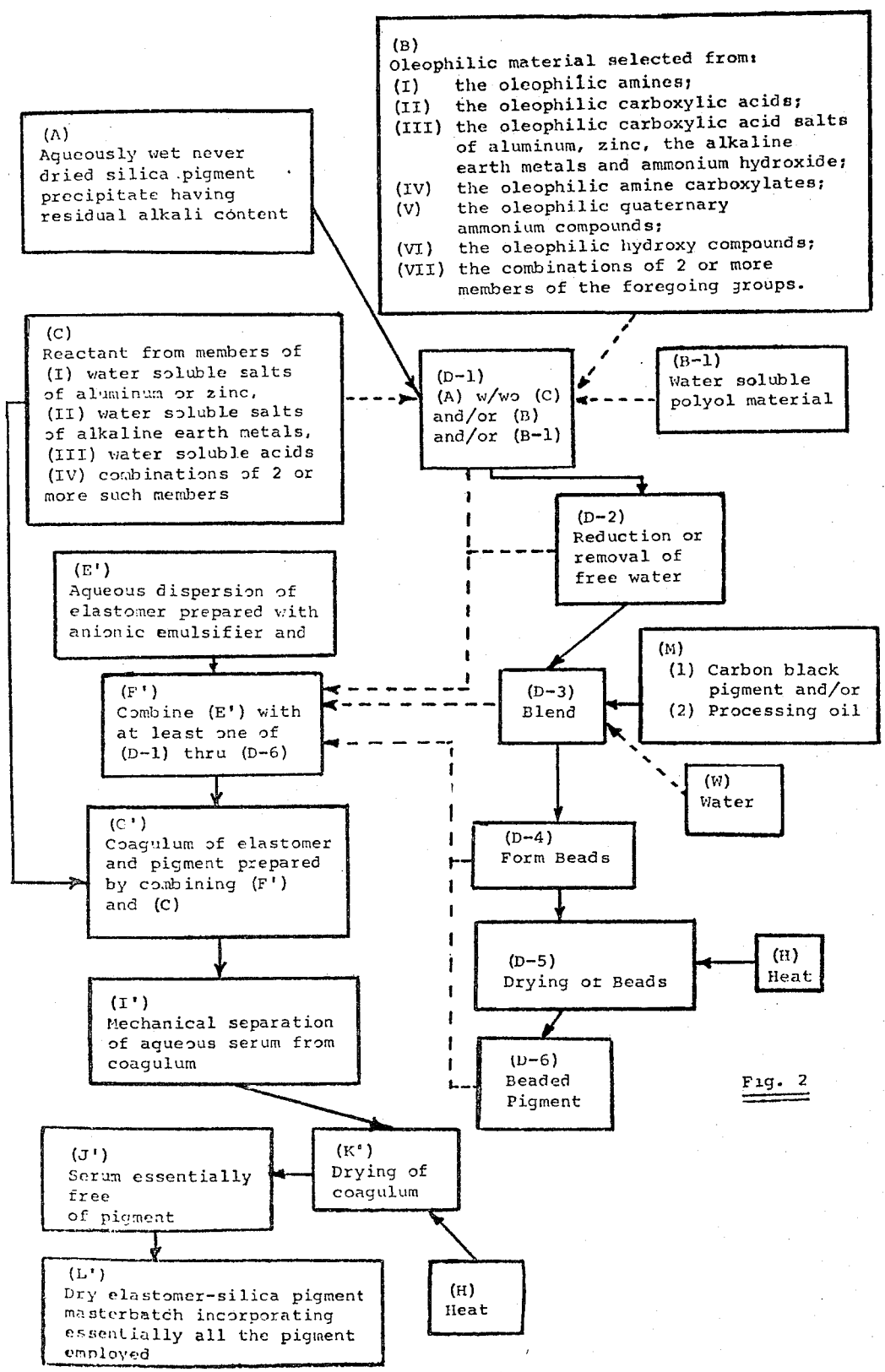

The wet silica pigment compositions (D-1) and (D-2) as above set forth, and (D-3), or (D-4), may be masterbatched in aqueously wet form with the elastomer in solvent dispersion (E)-(FIG. 1) or aqueous dispersion (E-1)-(FIG. 2).

In the case of the elastomer solution masterbatching (FIG. 1) the overall process comprises the further steps of:

E. providing an organic solvent dispersion of the elastomer containing (1) 100 parts of the elastomer (E') by weight, and (2) the solvent (S') of which is essentially water immiscible, F. combining with the elastomer solution (E) the wet silica pigment composition (D-1), (D-2) and/or (D-3), and (G) to (L) removing the solvent and aqueous phase and recovering the resulting combination as a masterbatch (L).

In FIG. 1, the elastomer (E') is dissolved in solvent (S')—which may be recycled solvent—to form solution (E) and said solvent itself, or as an azeotrope with water, preferably has a boiling point lower than that of water at atmospheric pressure, and the viscosity of the elastomer-solvent dispersion (i.e., solution) (E) preferably should be selected in the range of 5,000 to 50,000 centipoises to facilitate the intimate blending as at (F), of the elastomer-solvent solution and the silica pigment composition (D-1), (D-2) and/or (D-3), which may be combined therewith in alkaline, essentially neutral, or acidic form as exemplified hereinafter.

The silica-elastomer masterbatch (L) is recovered in FIG. 1, by separating the volatiles from the coagulum, preferably in two steps (G) and (I), when the solvent or its aqueous azeotrope ca be volatilized in step (G) prior to separation of the solids from the remaining aqueous phase in step (I). The volatilizing of the solvent, step (G) to convert the mixture (F) to coagulum and aqueous serum may be effected by running the dispersion (F) into hot water. The greater part of the separation of the coagulum from the aqueous serum in step (I) is preferably effected by mechanical dewatering, e.g., filtration, decanting, centrifuging, etc., to reduce the heat requirement for final drying of the masterbatch. The serum removed by mechanical dewatering is found to be essentially free of silica pigment as indicated at (J) in the drawing and the dry elastomer-silica pigment masterbatch thus incorporates essentially all of the pigment employed. The process thus curbs silica losses and assures a uniform silica pigment content in the masterbatch.

In the case of the elastomer latex (i.e., aqueous dispersion) masterbatching (FIG. 2) the overall process comprises steps (E') through (L'), there shown, namely:

E'. providing an aqueous dispersion containing (1) 100 parts by weight of the elastomer and (2) from 0.5 to 15 parts by weight of anionic dispersing agent;

F'. forming a mixture of (1) the aqueous elastomer dispersion—from (E)—, and (2) the wet silica pigment composition (D-1), (D-2) and/or (D-3), and (3) a sufficient quantity of the reactant material provided in step (c) to cause coagulation of the solids of the combination, whereby there is formed a coagulum of such solids rendering the aqueous serum of the combination essentially free of silica pigment; and G'. to L'. recovering the coagulum as a masterbatch.

As is shown in the drawings the recovery steps (I') through (L') in FIG. 2, corresponds to steps (I) through (L) of FIG. 1, already described, and hence require no further description.

In certain preferred embodiments, (1) the solution masterbatch (FIG. 1) may be prepared from dry silica pigment compositions before or after beading (D-5) or (D-6), and (2) the latex masterbatches (FIG. 2) may also be prepared from silica pigment compositions before or after beading (D-5) or (D-6) by aqueously dispersing such dry pigment or dry pigment beads prior to masterbatching.

OLEOPHILIC MATERIALS

The oleophilic materials employed in preferred embodiments of the present invention are selected from the class consisting of the members of the following groups: Group (I) the oleophilic amines; Group (II) the oleophilic carboxylic acids; Group (III) the oleophilic carboxylic acid salts of aluminum, zinc, the alkaline earth metals, and ammonium hydroxide and combinations thereof; Group (IV) the oleophilic amine carboxylates; Group (V) the oleophilic quaternary ammonium compounds; Group (VI) the oleophilic hydroxy compounds; Group (VII) combinations of any two or more members of the foregoing groups.

GROUP (I) - OLEOPHILIC AMINES

The oleophilic amines are those meeting the following definition (A):

A. The oleophilic amines have from 1 to 10 primary and/or secondary and/or tertiary amine groups and not more than 36 carbon atoms per amine group and have at least one amine group attached to a chain of at least 8 carbon atoms and not more than 36 carbon atoms imparting oleophilic properties to the compound.

Oleophilic amines meeting this definition (A) are exemplified by the following categories:

A 1. long-chain primary amines represented by the formula $R-NH_2$ in which R contains from 8 to 36 carbon atoms and includes but is not limited to octyl amine, decyl amine, dodecyl amine, tetradecyl amine, hexadecyl amine, octadecyl amine, palmitoleyl amine, oleyl amine, linoleyl amine, linolenyl amine, the mixed primary amines derived from fatty oils such as coco amine, soybean amine, tallow amine, rosin amine, and particularly or completely hydrogenated amines derived from the above unsaturated amines, and the like;

A 2. long-chain secondary amines having at least a single alkyl substituent containing from 8 to 36 carbon atoms, e.g., long-chain secondary amines represented by the formula

in which R contains from 8 to 36 carbon atoms and R' contains from 1 to 36 carbon atoms, and includes but is not limited to dioctyl amine, didecyl amine, didodecyl amine, ditetradecyl amine, dihexadecyl amine, dioctadecyl amine, dipalmitoleyl amine, dioleyl amine, dilinoleyl amine, dilinolenyl amine, the mixed secondary amines derived from fatty oils such as dicoco amine, disoybean amine, ditallow amine, hydrogenated ditallow amine, N-methyloctylamine, N-methyldodecylamine, N-methylhexadecylamane, N-ethyloctylamine, N-ethyloctadecylamine, N-propyldodecylamine, N-butyloctylamine, and the like.

A 3. long-chain tertiary amines having at least are alkyl or alkylene substituent containing from 8 to 36 carbon atoms, e.g., (a) long chain tertiary amines represented by the formula

in which R contains 8 to 36 carbon atoms, R' contains 1 to 36 carbon atoms and R'' contains 1 to 36 carbon atoms and includes but is not limited to trioctyl amine, tridodecyl amine, tristearyl amine, octydimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and (b) long chain cyclic tertiary amines including but not limited to N-coco morpholine, N-soya morpholine, N-tallow morpholine and the like.

A 4. long-chain diamines and polyamines having at least one alkyl or alkylene substituent containing from 8 to 36 carbon atoms including, but not limited to, the diamines represented by the formula $RNH(CH_2)_xNH_2$ in which R contains 8 to 36 carbon atoms and $x$ is an integer from 1 to 18, as for example N-coco-trimethylene diamine, N-soya trimethylene diamine, N-tallow trimethylene diamine, N-oleyl trimethylene diamine, N-octyl dimethylene diamine, N-octyl tetramethylene diamine, and the above diamines with one or more amine hydrogens replaced by a methyl, ethyl, propyl or butyl group, and the like.

A 5. long-chain polyethoxylated and polyproxylated secondary and tertiary amines containing at least one alkyl or alkylene substituent having from 8 to 36 carbon atoms e.g., the polyalkoxylated amines represented by the formulas

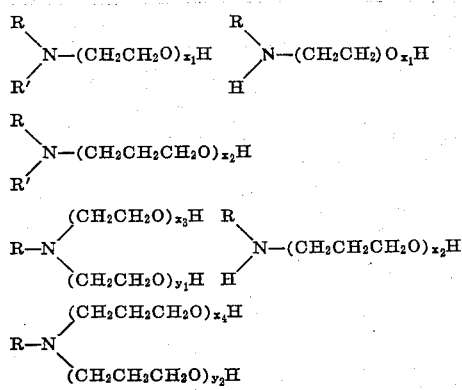

in which R contains 8 to 36 carbon atoms and R' contains 1 to 36 carbon atoms and $x_1$, $x_2$, $x_3$, $x_4$, $y_1$, $y_2$ are each integers between 1 and 30, and include but are not limited to coco amine, soybean amine, tallow amine and stearyl amine each reacted with a plurality, e.g. 2, 5, 10 or 15, moles of ethylene oxide or propylene oxide per mole of amine; and the like;

A 6. long-chain polyethoxylated and polypropoxylated diamines having at least a single alkyl or alkylene substituent having from 8 to 36 carbon atoms e.g., the diamines represented by the formulas

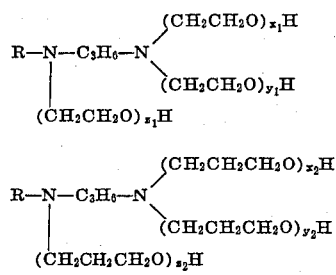

in which R contains 8 to 36 carbon atoms and $x_1$, $x_2$, $y_1$, $y_2$, $z_1$ and $z_2$ are each integers between 1 and 30, which include, but are not limited to, the reaction products of N-coco trimethylene diamine, N-soya trimethylene diamine and N-tallow trimethylene diamine each with a plurality, e.g., 3, 10 or 20 moles of ethylene oxide or propylene oxide per mole of amine, and the like.

A 7. long-chain imidazolines and the like having at least a single substituent containing a chain of at least 8 carbon atoms, such for example those set forth in U.S. Pat. Nos. 1,999,989; 2,155,877; 2,155,878; 2,194,419; 2,267,965; 2,155,878; 2,355,837; 2,267,965; 2,708,666; 3,050,529; 3,408,361; 3,354,175; and 3,468,904, herein incorporated by reference.

Group (II) - Oleophilic Carboxylic Acids and their alkali metal and ammonium water soluble salts.

The oleophilic carboxylic acids are those meeting the following definition (B):

B. The oleophilic carboxylic acids have from 1 to 10 carboxylic acid groups and have at least one carboxylic acid group attached to a chain of from 8 to 36 carbon atoms imparting oleophilic properties to the compound. Oleophilic carboxylic acids meeting this definition (B) are exemplified by the following category:

B 1. the fatty acids and the rosin acids and derivatives thereof, which have from 1 to 10 carboxyl groups and a chain of from 8 to 36 carbon atoms attached to at least one carboxyl group thereof, and such long-chain carboxylic acids include the individual fatty acids such as caprylic, capric, lauric, myristic, palmetic, stearic, oleic, linoleic, linolenic, abietic, hydroabietic, dehydroabietic, ricinoleic, and the like; the naphthenic acids; the mixed fatty acids derived from vegetable oils such as coconut, palm, linseed, cottonseed, soya, tung, perilla, tall, corn, oiticica, and castor oils, and the like; the rosin and disproportionated rosin acids; the mixed fatty acids derived from animal fats such as tallow fatty acids; the mixed fatty acids derived from fish oils, such as herring, menhaden, salmon and sardine oils, and the like; the dimers, trimers, and tetramers of the foregoing unsaturated fatty acids such as the dimer acids from bodied soya bean oil, the trimer acids from bodied linseed oil, and the dimers, trimers and tetramers of fish oil fatty acids; and derivatives of the foregoing such as the partially and totally hydrogenated, hydroxylated, oxidized, epoxidized, halogenated, cyanoated, sulfurated, styrenated, and maleated (maleic anhydride) fatty acids, and the like. The saturated carboxylic acids are preferred.

Group (III) - Oleophilic Carboxylic Acid Salts of Aluminum Zinc, the Alkaline Earth Metals and Ammonium Hydroxide.

The oleophilic carboxylic acid salts of this groups are those meeting the following definition (C):

C. the aluminum, zinc, alkaline earth metal, and ammonium salts of oleophilic carboxylic acids which have from 1 to 10 carboxylic acid groups and have a chain of from 8 to 36 carbon atoms attached to at least one carboxyl group thereof imparting oleophilic properties to the compound. Oleophilic carboxylic acid salts meeting this definition (C) are exemplified by the following category:

C 1. the aluminum, zinc, alkaline earth metal and ammonium salts of the oleophilic carboxylic acids set forth in category (B) (1) above.

Group (IV) - Oleophilic Amine Carboxylates

The oleophilic amine carboxylates are those meeting the following definition (D):

D. The oleophilic amine carboxylates are the members of the class consisting of (a) the neutral, basic and acidic carboxylic acid salts of amines, wherein (b) at least one amine group or carboxyl group has attached thereto a carbon chain of at least 8 carbon atoms imparting oleophilic properties to the compound, and (c) such oleophilic amine carboxylates being the reaction products of precursor amines having from 1 to 10 primary and/or secondary and/or tertiary amine groups and not more than 36 carbon atoms per amine group, and precursor carboxylic acids having from 1 to 10 carboxyl groups and not over 36 carbon atoms per carboxyl group, and (d) such precursor amines and carboxylic acids preferably having boiling points above the boiling point of water at atmospheric pressure.

Oleophilic amine carboxylates meeting the definition (D) are exemplified by the following categories:

D 1. The reaction products of any one or more members selected from categories (A) (1) through (A) (6) with any one or more members selected from category (B) (1).

D 2. The reaction product of any one or more members selected from categories (A) (1) through (A) (6) with any one or more of the carboxylic acids having from 1 to 10 carboxylic acid groups and having no chain of over seven carbon atoms attached to any carboxyl group thereof, e.g.: acetic, propionic, butyric, valeric, caproic, heptanoic and their isomers, oxalic, fumaric, adipic, succinic, malonic, glutaric, caproic, suberic, pimelic, hydroxyacetic, lactic, glyceric, 2-hydroxybutanoic, and the like.

D 3. The reaction products of any one or more of the members of category (B) (1) above with any one or more amines having from 1 to 10 primary and/or secondary and/or tertiary amine groups and having no chain of more than seven carbon atoms attached to any amine group thereof, e.g.: n-amylamine, the hexylamines, the heptylamines, ethylene diamine, the propylene diamines, e.g., 1,3-diaminopropane, the butylene, pentylene, hexylene and heptylene diamines, the ethylene and propylene substituted ethylene diamines and propylene diamine and polymers of these e.g., diethylene diamine, triethylene diamine, tetraethylene triamine, pentaethylene tetramine, hexaethylene pentamine, octaethylene heptamine and the like; monoethanolamine, diethanolamine, triethanolamine, the propanolamines, the dipropanolamines, the tripropanolamines, the hydroxy $C_4$ amines, the hydroxy $C_5$ amines, the hydroxy $C_6$ amines, the hydroxy $C_7$ amines and similar diamines and triamines having hydroxyl groups; morpholine and the substituted morpholines in which the substituents in the 4, 2, and 6 position of the morpholine may be one or more methyl, ethyl, propyl and the like alkyl groups, hydroxyl groups or amine groups, and other amines having boiling points over 100° C. at atmospheric pressure and having no carbon chains greater than 7 carbon atoms attached to an amine group.

Group (V) - Oleophilic Quaternary Ammonium Compounds

The oleophilic quaternary ammonium compounds are those meeting the following definition (E):

E. The oleophilic quaternary ammonium materials have at least one quaternary ammonium group with from 6 to 76 carbon atoms and have at least one quaternary ammonium group attached to a substituent of at least 6 carbon atoms and not more than 36 carbon atoms, imparting oleophilic properties to the compound.

Oleophilic quaternary ammonium compounds meeting this definition (E) are prepared, e.g., by reacting quaternizing agents such as alkyl halides, e.g., methyl chloride, methyl bromide, aralkyl halides, e.g., benzyl chloride, alkyl sulfonates or alkyl phosphates, e.g., dimethyl sulfate, or the like, with amine compounds having at least one tertiary amine group and having at least one hydrocarbon substituent which contains 6 to 36 carbon atoms and which may comprise groups of straight chain, branched chain, cyclic and/or aryl configuration, and which may include substituent groups containing oxygen, nitrogen, sulfur, phosphorous, fluorine or chlorine atoms. Such quaternary ammonium compounds are exemplified by the following categories (E) (1) to (E) (5):

E 1. The quaternary ammonium compounds derived from tertiary monoamines such as those represented by the formulas:

| Amine tertiary | Quaternizing agent | Quaternary ammonium compound |
|---|---|---|
| $\begin{array}{c} R \\ R'-N \\ R'' \end{array}$ | $CH_3Cl$, methyl chloride | $\left[\begin{array}{c} R \\ R'-N-CH_3 \\ R'' \end{array}\right]^+ Cl^-$ |
| $\begin{array}{c} R \\ R'-N \\ R'' \end{array}$ | $C_6H_5CH_2Cl$, benzyl chloride | $\left[\begin{array}{c} R \\ R'-N-CH_2C_6H_5 \\ R'' \end{array}\right]^+ Cl^-$ |
| $\begin{array}{c} CH_2-CH_2 \\ O \quad\quad N-R \\ CH_2-CH_2 \end{array}$ | $CH_3Cl$ | $\left[\begin{array}{c} CH_2CH_2 \quad R \\ O \quad N \\ CH_2CH_2 \quad CH_3 \end{array}\right]^+ Cl^-$ | in which R contains 6 to 36 carbon atoms, R' contains 1 to 36 carbon atoms and R'' contains 1 to 36 carbon atoms. This category includes but is not limited to the so quaternized products of trihexyl amine, tridodecyl amine, tristearyl amine, octyl-dimethyl amine, dioctyl methyl amine, dodecyl dimethyl amine, didodecyl methyl amine, octadecyl dimethyl amine, dioctadecyl methyl amine, the mixed tertiary amines derived from fatty oils, coco dimethyl amine, dicoco methyl amine, soybean dimethyl amine, disoybean methyl amine, tallow dimethyl amine, ditallow methyl amine, and the hydrogenated or partially hydrogenated products of unsaturated tertiary amines, and the like; and the quaternization products of the long chain cyclic tertiary amines including but not limited to N-coco morpholine, N-soya morpholine, N-tallow morpholine and the like, some of which are commercially available under the trademark designations "Arquad".

E 2. The quaternary ammonium compounds derived from diamines and represented by the formulas:

| Amine tertiary | Quaternizing agent | Quaternary ammonium compound |
|---|---|---|
| 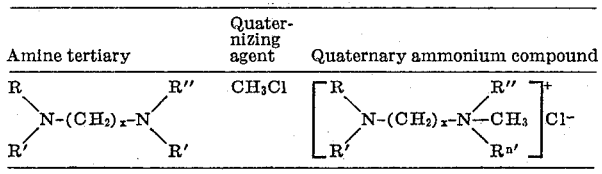 | CH₃Cl | | in which R contains 6 to 36 carbon atoms, R', R", R''' contain each 1 to 36 carbon atoms and $x$ is an integer from 1 to 18, e.g., Redicote E-11, a trademarked product (reported to have the formula identified in Table VIII).

E 3. The quaternary ammonium compounds derived from long-chain polyethoxylated and polypropoxylated amines and represented by the formulas:

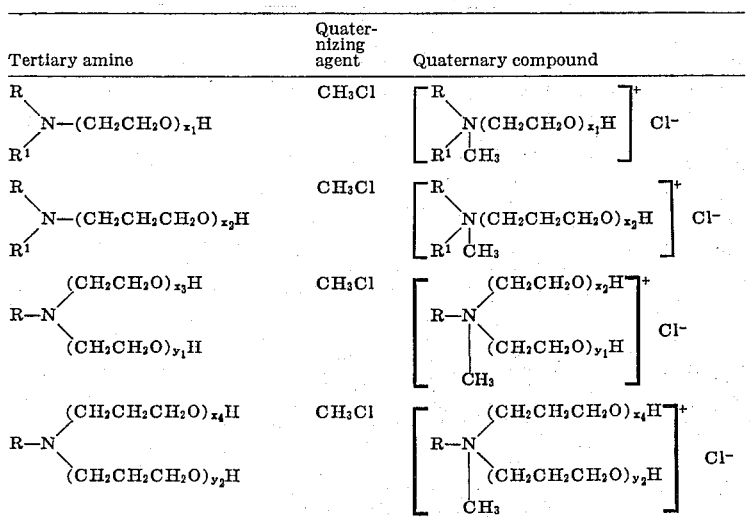 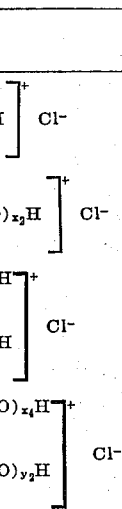

in which R contains 6 to 36 carbon atoms and R' contains 1 to 36 carbon atoms and $x_1, x_2, x_3, x_4, y_1, y_2$ are each intergers from 1 to 30. This category includes but is not limited to coco amine, soybean amine, tallow amine and stearyl amine each reacted with a plurality e.g., 2, 5, 10 or 15, moles of ethylene oxide or propylene oxide per mole of amine and quaternized, and the like; e.g., those commercially available under the trademark "Ethoquad".

E 4. The quaternary ammonium compounds derived from long-chain polyethoxylated and polypropoxylated diamines and represented by the formula

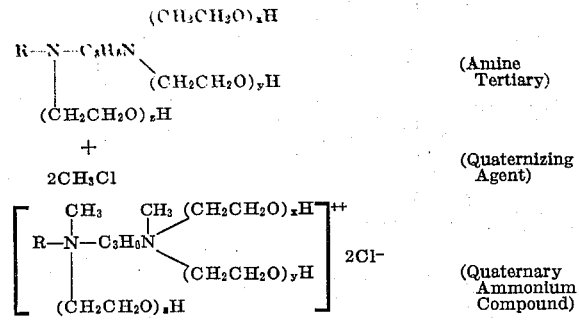

in which R contains 6 to 36 carbon atoms and $x$, $y$ and $z$ are integers from 1 to 30.

This category includes, but is not limited to, the quaternized products of N-coco trimethylene diamine, N-soya trimethylene diamine and N-tallow trimethylene diamine each with a plurality, e.g., 3, 10 or 20 moles of ethylene oxide or propylene oxide per mole of amine, and the like.

5. Other types of quaternary ammonium compounds in which R contains from 6 to 36 carbon atoms include the following:

(a) 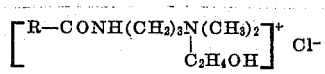

as for example when, R = $C_{17}H_{35}$, Aerosol SE, a trademarked product, (b) 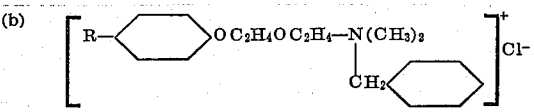

as for example, when R = $C_8H_{17}$, Hyamine 1622, a trademark product.

(c) 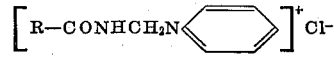

as for example, when R = $C_{17}H_{35}$, Zelan, a trademark product, and other compounds prepared by reacting fatty acid amides with formaldehyde (e.g., paraformaldehyde) with a tertiary base such as pyridine, alkylpyridine or quinoline.

(d) 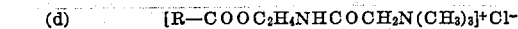

as for example, when R = $C_{11}H_{23}$, Emulsept, a trademark product.

(e) 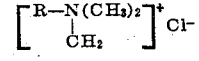

as for example, when R = $C_{18}H_{37}$, Triton K-60, a trademark product.

f. The oleophilic quaternary ammonium derivatives of the imidazolines set forth under Group (I) (A) (7) hereof and the like, examples of which are set forth in U.S. Pat. Nos. 2,528,378; 2,268,273 and 2,773,068, herein incorporated by reference.

It is to be understood that the oleophilic quaternary ammonium compounds include the oleophilic quaternary ammonium amine compounds but do not include the oleophilic amines containing only primary, secondary and/or tertiary amine groups or their acid salts, which fall into categories (A) (1) to (A) (7) and (D) (1) to (D) (3), above.

Group (VI) - Oleophilic Hydroxy Compounds

The oleophilic hydroxy compounds are those meeting the following definition (F):

F. The oleophilic hydroxy compounds have from 1 to 10 hydroxy groups and have at least one hydroxyl group attached to a chain of from 6 to 36 carbon atoms imparting oleophilic properties to the compound.

Oleophilic hydroxy compounds meeting this definition (F) are exemplified by the members of the following categories:

F 1. The mono- and polyols prepared by reducing the acids of category (B) (1).

F 2. Alcohols having the designated chain preparable from petroleum products, e.g., by the oxo process.

The carbon chains referred to in definitions (A) to (F) above may be alkyl, alkylene, halo alkyl and haloalkylene and may be wholly or partly of linear, branched, cyclic or aromatic configuration.

WATER SOLUBLE POLYOL MATERIALS

The water soluble polyols are those meeting the following definition (G):

G. The water soluble polyols which may be employed in the present invention are those which have from 2 to 10 hydroxyl groups and a weight average molecular weight less than 5000. Water soluble polyols meeting this definition (G) are exemplified by the following categories:

G 1. The glycols and polyglycols, e.g., ethylene and propylene glycols and the polymers of ethylene oxide and/or propylene oxide having less than 5000 mol. wt.

G 2. The water soluble sugars, e.g., corn, beet and cane (molasses) sugars.

G 3. The water soluble alcohol amines such as monoethanolamine, diethanolamine and triethanolamine and similar propanolamines and the like.

CARBON BLACK

By the term "carbon black" as used herein is meant any carbon blacks suitable for use by the rubber industry and set forth under the title "carbon blacks" at pages 251 to 264 of the publication entitled "Materials and Compounding Ingredients for Rubber", compiled by J. V. Del Gatto, published by Rubber World, 1968 and herein incorporated by reference, e.g., Philblack O (TM), Statex K (TM), Thermax (TM), Kosmobile 77 (TM), and the like.

PROCESSING OILS

The Term "processing Oils" as used herein is meant rubber processing material of both liquid and solid types (if required the solids types can be converted to the liquid state for use herein with the aid of solvent or plasticizer) and include processing materials set forth under "Plasticers and Softeners" at pages 149 to 214 of the publication entitled "Materials and Compounding Ingredients for Rubber", compiled by J. V. Del Gatto, published by Rubber World, 1968, and herein incorporated by reference and among the types of processing materials especially suitable for use in this invention are (a) the coal tar oils and pitches e.g., Bardol (TM), Bardol B (TM); (b) the asphalts, e.g., BRH No. 2 (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber compounding or the oil extension of synthetic rubber; (d) the coumarone-indene oils and resins, e.g., Cumar Resin RH, -P10, -T(TM); (e) the liquid ester type plasticizers, e.g., dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g., Durez 12687, 12707 (TM) and the like; (g) the hydrocarbon resins, e.g., Neville-LX 782, -LX 125, (TM), Para-flux, Para Resin 2457 (TM); (h) the hydrocarbon resin-coumarone indene polymers, e.g., Picco Resins (TM); (i) the pine tars and pine tar oils, rosin and rosin oils, and tall oil and its derivatives, e.g., PT-101, PT-401, PT-800 (TM); and the like.

ELASTOMERS (AND SOLVENTS)

The solvent cements, dispersions, or solutions and the aqueous dispersions or latices of elastomers employable herein include, but are not limited to, those of the diene homopolymer rubbers such as polybutadiene, polyisoprene, polychloroprene; those of diene copolymer rubbers such as the copolymers of diene monomers and monomers containing and copolymerizable therewith through a single ethylenically unsaturated group, e.g., butadiene-styrene, butadiene-acrylonitrile or methacrylonitrile, butadiene-acrylate or methacrylate ester; and rubbery copolymers of hydrocarbon monomers with polar vinylidene (including vinyl) monomers copolymerizable therewith, elastomers from olefins and/or cyclic olefins and/or cyclic diolefins and/or dicyclic diolefins including the ethylene-propylene copolymers, the ethylenepropylene terpolymers, the ethylene-butylene copolymers and terpolymers, the butadiene-monoolefin interpolymers, the isobutylene-isoprene copolymers, and the like, elastomers from olefin oxides, poly-aromatic ethers and poly-alkyl ethers and other elastomers containing oxygen in the molecule, the fluorohydrocarbon and fluorocarbon elastomers, as well as mixtures and combinations thereof with processing oils.

The elastomers preferred to be employed in solution in the present invention include, but are not limited to, those prepared in anhydrous solvent systems, e.g., with the aid of catalyst systems employing metal alkyls and/or transition metal halides. In certain of these systems after the polymerization of the olefin and/or diolefin is complete and the catalyst has been removed, the elastomer is already in solvent solution or can readily be transferred to a solvent solution suitable for masterbatching as practiced in this invention.

In selecting the solvent the more highly volatile hydrocarbon, or halohydrocarbon, or halocarbon solvents are desirable, e.g.,: butane, pentane, hexane, cyclohexane, methylene chloride, carbon tetrachloride, and the like.

The elastomers preferred to be employed in aqueous dispersion in the present invention include, but are not limited to, those prepared by emulsion polymerization employing anionic emulsifiers, and such elastomers may be employed in the resulting latex form. Also one may employ aqueous dispersions of elastomers formed from dry polymers by known methods.

The term "water soluble acids" as used herein designates the inorganic and organic acids which are water soluble both as free acids and in the form of alkali metal or ammonium salts. Examples of such acids are hydrochloric, sulfuric, nitric, phosphoric, formic, acetic, hydroxyacetic, the chloroacetic acids, propionic, oxalic, tartaric, citric, maleic, and the like.

DESCRIPTION OF THE PREFERRED EMBODIMENTS

Preferred embodiments of the present invention are set forth in the following examples which also illustrate the invention in more detail.

In these examples, the combinations of ingredients were effected by intimate mixing in the high speed, high shear Waring Blender, except where otherwise noted, and the beading was effected by using a cake-mixer type laboratory beader except where otherwise noted. The removal of solvent from the intimate mixtures of the aqueous silica pigment compositions and the rubber-cements was accomplished by injecting the said mixtures into boiling water and the volatile solvent readily boiled off leaving a wet coagulum or wet crumb in aqueous serum, which serum was free of silica or essentially free of silica.

The invention may be employed to improve wet silica-polymer solution or aqueous dispersion masterbatching and masterbatches, using any alkaline slurry of never dried wet silica pigment containing bound alkali, and is applicable to the formation of masterbatches therewith with elastomer-organic solvent dispersions, i.e., cements, of all solvent soluble elastomers, and aqueous dispersions of all aqueously dispersible elastomers.

Silica pigments containing residual alkali suitable for masterbatching in accordance with the present invention are usually precipitated by the gradual acidulation of aqueous sodium silicate solution with the aid of carbon dioxide, and in accordance with the preferred embodiments of this invention are continuously maintained in an aqueously wet state without ever having been dried therefrom until incorporated in the processes and products of the present invention.

EXAMPLES

Silica Preparation

The aqueously wet never dried alkaline silica pigment employed in all the examples was prepared in a manner similar to Example 9 of U.S. Pat No. 3,250,594 except that the ratio of 41° Be. commercial sodium silicate ($Na_2O/(SiO_2)_{3.22}$) to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2 percent and the filter cake had a solids of approximately 10 percent by weight. The resulting aqueously wet silica pigment was designated wet alkaline silica pigment-I, and had a bound and residual alkali content of about 1.5 percent by weight as $Na_2O$, and a serum pH of about 8.5 (8.5 to 9.5).

A portion of this alkaline silica filter cake was slurried with about a half volume of water and was acidified to a pH of 4.5 with dilute sulfuric acid and as a filter cake, with washing to a filtrate pH of about 7 to 7.5, had a solids of approximately 10 percent by weight. The resulting aqueously wet silica slurry was designated wet silica pigment-II.

The just described filter cakes having a solids content of about 10 percent by weight are embraced within the term "wet silica pigment" (which herein connotes aqueously wet silica pigment) as are wet pigments of more reduced water content which can be prepared by pressing the said filter cakes, or of augmented water content, e.g., slurries having less than 10 percent solids content, and the terms "aqueously wet silica pigment" or "aqueously wet state", as employed herein are generic to all such conditions. Thus these terms as employed herein embrace aqueously wet silica pigment materials having a solids content in the range of about 1 percent to about 65 percent solids, dry basis, by weight; however, for economy in the practice of the invention wet silica pigments of reduced water content (solids content 8 to 36 percent) are preferred.

To determine pigment quality a portion of wet silica pigment-II was dried at 105°C., micropulverized and compounded as set forth in Table I hereof.

TABLE I

| Compound Ingredients: | Quantities (pts. wt.) |
|---|---|
| Butadiene-styrene copolymer[1] | 100 |
| Silica pigment-II dried | 60 |
| Antioxidant, 2,2-methylene-bis (4-methyl-6-t.-butylphenol) | 2.0 |
| Magnesium oxide | 4.0 |
| Paracoumarone-indene resin[2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502
[2] Cumar Resin RH, a trademark product of Allied Chemical Corp.

The compound was aged over-night, re-milled and cured for 45 minutes at 28° F.

The physical test data for the vulcanizate so prepared with the foregoing silica pigment is set forth in Table II hereof.

TABLE II

| Silica tested (in vulcanizate) | Hardness (Shore A) | Tensile (psi) | Modulus (300%) | Elong. (%) |
|---|---|---|---|---|
| Silica Pigment-II | 72 | 3530 | 1140 | 575 |

In the following tabulations of Examples the ingredients (A), (B), (C) etc. are listed in the oroder of their addition except where otherwise specifically set forth. The masterbatches are conveniently set forth. The masterbatches are conveniently prepared at room temperatures, however, elevated temperatures may be employed as to accelerate the masterbatch formation.

Table III, examples 1 to 4, illustrates the treatment of wet hydrated silica pigment with reactant material and with oleophilic amine material to produce (1) a wet treated silica pigment or (2) when dried a dry treated silica pigment. The oleophilic amine treated silica pigment can be combined in a weight ratio of wet to dry such as to provide sufficient quantity of water (about 150 pts./100 pts. pigment) to permit beading of the pigment.

Tables IV and V, examples 5 to 10, exemplify the use of wet silica pigment treated with oleophilic amine material and masterbatched with elastomer latices prepared with anionic dispersing agent. In the event silica production and latex masterbatching can not be concurrently carried out then the treated silica may be dried and then redispersed in water to produce a slurry for masterbatching with aqueous dispersion of elastomer.

Table VI exemplifies the inclusion of carbon black and/or processing oil with the oleophilic amine treated silicas and masterbatching with elastomer latices.

Tables III, IV, V and VI correspond to Tables VIII, V, IV and X, respectively, of applicant's concurrently filed U.S. Pat. application (Case 48DM-2A) and for further examples reference may be made to examples 1 to 4, 12 to 20, 25 to 27 and 35 to 36 of said application herein incorporated by reference.

TABLE III

| | | Dispersible Silica (Parts by wt.) | | | |
|---|---|---|---|---|---|
| Example | | 1 | 2 | 3 | 4 |
| (A) | Silica Slurry Alkaline silica pigment-I (pH 8.5–9.5) | 150 | 150 | 150 | 150 |
| | Dry solids basis | 15 | 15 | 15 | 15 |
| | Water | 50 | 50 | 50 | 50 |
| (B) | Reagent Aqueous Solution | | | | |
| | 2% aluminum sulfate[1] | 18 | — | — | 9 |
| | 2% zinc sulfate | — | 20 | — | — |
| | 2% sulfuric acid | — | — | 8.5 | 4.5 |
| | Silica slurry, pH | 5.0 | 6.5 | 7.0 | 6.0 |
| (C) | Oleophilic Amine Material in Isopropanol | | | | |
| | 10% Armeen DMCD[1] | 10 | — | — | — |
| | 10% Armeen 2C[2] | — | 15 | — | — |
| | 10% Ethomeen T/12[3] | — | — | 30 | — |
| | 10% Armeen T[4] | — | — | — | 15 |
| (D) | Treated Silica Pigment | | | | |
| | (a) Filtered (X) | X | X | X | X |
| | (b) Dried (105°C.) (X) | X | X | X | X |

[1] Armeen DMCD — Coco dimethyl amine, a trademark product.
[2] Armeen 2C — Dicoco amine, a trademark product.
[3] Ethomeen T/12 — Polyoxyethylene tallow amine, a trademark product.
[4] Armeen T, tallow amine, a trademark product.
(a) Provides treated wet silica suitable for masterbatching and in selected combination with (b) dry silica provides composition suitable for beading.
(b) The dry treated silica is especially suitable for solution masterbatching, however, after dispersing in water such silica can be employed for latex masterbatching.

TABLE IV

| | | Polymer-Silica Masterbatch (Parts by wt.) | | |
|---|---|---|---|---|
| Example | | 5 | 6 | 7 |
| (A) | Silica Pigment Slurry Alkaline silica pigment-I (pH 8.5–9.5) | 150 | 150 | 150 |
| | Dry solids basis | 15 | 15 | 15 |
| | Water | 50 | 50 | 50 |
| (B) | Reagent-Aqueous Solution | | | |
| | 2% sulfuric acid | 25.5 | 25.5 | 25.5 |
| | Silica slurry pH* | 7 | 7 | 7 |
| | *Filter cake after washing. | | | |
| (C) | Oleophilic Amine Material in Isopropanol | | | |
| | 10% Duomeen T[1] | 1.5 | 1.5 | 1.5 |
| (D) | Polymer Latex | | | |
| | Butadiene-acrylonitrile[2] | 63 | — | — |
| | Butadiene-acrylonitrile[3] | — | 61 | — |
| | Chloroprene[4] | — | — | 43 |
| | Dry solids basis | 25 | 25 | 25 |
| | Antioxidant[5] | 0.5 | 0.5 | 0.5 |
| | Water | 180 | 180 | 200 |
| (E) | Coagulant-Aqueous Solution | | | |
| | 2% Aluminum sulfate[6] | 125 | 90 | 70 |
| | Water | 250 | 250 | 250 |

[1] Duomeen T; N-tallow trimethylene diamine, a trademark product.
[2] Hycar 1570×20, a carboxyl-modified butadiene/acrylonitrile latex, a trademark product.
[3] Hycar 1561, a butadiene/acrylonitrile latex, a trademark product.
[4] Chloroprene — Neoprene 635 latex, a trademark product.
[5] Antioxidant is 2,2'-methylene-bis(4-methyl-6-t.-butylphenol).
[6] Waring blender (a trademark product).

TABLE IV — Continued

Polymer-Silica Masterbatch
(Parts by wt.)

| Example | | 5 | 6 | 7 |
|---|---|---|---|---|
| (F) | Coagulation | | | |
| | Treated silica + polymer latex and coagulant were combined (X) | X | X | X |
| | pH serum | 4.0 | 4.0 | 4.0 |
| | Silica in serum | None | None | None |
| (G) | Masterbatch | | | |
| | Filtered and washed (X) | X | X | X |
| | Dried (105 °C.) (X) | X | X | X |

TABLE V

Polymer-Silica Masterbatch
(Parts by wt.)

| Example | | 8 | 9 | 10 | 11 |
|---|---|---|---|---|---|
| (A) | Silica Pigment Slurry | | | | |
| | Alkaline silica pigment-I (pH 8.5–9.5) | 150 | 150 | 150 | 150 |
| | Dry solids basis | 15 | 15 | 15 | 15 |
| | Water | 50 | 50 | 50 | 50 |
| (B) | Reagent-Aqueous Solution | | | | |
| | 10% sulfuric acid | 5.1 | 5.1 | 5.1 | 5.1 |
| | Silica slurry pH* | 7 | 7 | 7 | 7 |
| | *filter cake after washing. | | | | |
| (C) | Oleophilic Amine Material in Isopropanol | | | | |
| | 10% Armeen DMCD[1] | 1.5 | — | — | — |
| | 10% Armeen 2C[2] | — | 1.5 | — | — |
| | 10% Ethomeen T/12[3] | — | — | 1.5 | — |
| | 10% Dehydroabietylamine | — | — | — | 1.5 |
| (D) | Polymer Latex | | | | |
| | Butadiene-styrene[4] | 153 | 153 | 153 | 153 |
| | Dry solids basis | 30 | 30 | 30 | 30 |
| | Antioxidant[5] | 0.6 | 0.6 | 0.6 | 0.6 |
| | Water | 150 | 150 | 150 | 150 |
| (E) | Coagulant-Aqueous Solution | | | | |
| | 2% aluminum sulfate[6] | 70 | 45 | 70 | 45 |
| | Water | 250 | 250 | 250 | 250 |
| (F) | Coagulation | | | | |
| | Added coagulant to treated silica + polymer latex (X) | X | X | X | X |
| | pH serum | 4.5 | 4.5 | 4.5 | 4.5 |
| | Silica in serum | none | none | none | none |
| (G) | Masterbatch | | | | |
| | Filtered and washed (X) | X | X | X | X |
| | Dried (105°C.) (X) | X | X | X | X |

[1] Armeen DMCD — Coco dimethyl amine, a trademark product.
[2] Armeen 2C — dicoco amine, a trademark product.
[3] Ethomeen T/12-di(polyoxyethylene) tallow amine, a trademark product.
[4] SBR 1502 (T.S. = 19.7%).
[5] Antioxidant is 2,2'-methylene-bis(4-methyl-6-t.-butylphenol).
[6] Aluminum sulfate = $Al_2(SO_4)_3 \cdot 14H_2O$.

TABLE VI

Polymer-Silica Masterbatch
Including Carbon Black and/or Processing Oil
(Parts by wt.)

| Example | | 11 | 12 | 13 | 14 |
|---|---|---|---|---|---|
| (A) | Silica Pigment Slurry | | | | |
| | Alkaline silica pigment-I (pH 8.5–9.5) | 25 | 25 | 25 | 25 |
| | Dry basis | 2.5 | 2.5 | 2.5 | 2.5 |
| | Water | 15 | 15 | 15 | 15 |

TABLE VI—Continued

Polymer-Silica Masterbatch
Including Carbon Black and/or Processing Oil
(Parts by wt.)

| Example | | 11 | 12 | 13 | 14 |
|---|---|---|---|---|---|
| (B) | Reagent-Aqueous Solution | | | | |
| | 2% Sulfuric acid | 4.2 | 4.2 | 4.2 | 4.2 |
| (C) | Combine (A) and (B) | | | | |
| | Blend, (X) | X | X | X | X |
| | Serum pH | 4.0 | 4.0 | 4.0 | 4.0 |
| (D) | Oleophilic Amine Material | | | | |
| | 5% Stearylamine** [1] | 4.0 | — | — | — |
| | 20% dicoco-amine** [2] | — | 0.65 | — | — |
| | 20% rosin amine** [3] | — | — | 0.50 | 1.5 |
| | &&in benzene | | | | |
| (E) | Combine (C) and (D) | X | X | X | X |
| (F) | Carbon Black | | | | |
| | Statex 160 [4] | — | 2.5 | — | — |
| | Philblack 0 [4] | — | — | 5.0 | — |
| | Thermax [4] | — | — | — | 7.5 |
| (G) | Processing Oil | | | | |
| | Sundex 2 × H [4] | 1 | — | — | 1 |
| (H) | Other Ingredients | | | | |
| | 5.6% Ammonia (aqueous) | 1 | — | — | — |
| | Water | 10 | 20 | 40 | 50 |

[1] Armeen T (a trademark product)
[2] Armeen 2C (a trademark product)
[3] Amine D (a trademark product)
[4] Trademark products.

Table VII exemplifies the preparation of a wet silica pigment treated with oleophilic amine compounds and the combining with organic solvent dispersions of elastomers, then removing the solvent to form a masterbatch. The amine treated wet silica can be dried prior to masterbatching with the elastomer cement.

Table VIII exemplifies the preparation of wet amine treated silica and combination with carbon black and/or processing oil and with the elastomer solvent solutions to form the masterbatches after removal of solvent.

Tables VII and VIII correspond to Tables III and XI, respectively, of applicant's concurrently filed U.S. Pat. application (Case 48DM-4A) and for further examples reference may be made to Examples 6 to 23 of said application herein incorporated by reference, and to Table VII-A, -B and -C herein.

TABLE VII

Silica-Polymer Masterbatch
(Parts by wt.)

| Example | | | 15 | 16 | 17 | 18 | 19 |
|---|---|---|---|---|---|---|---|
| (A) | Silica Pigment Slurry-Treated Oleophilic Amine Material | | | | | | |
| | (a) | Silica Pigment Slurry | | | | | |
| | | Alkaline silica pigment-I (pH 8.5–9.5) | 150 | 150 | 150 | 150 | 150 |
| | | Dry solids basis | 15 | 15 | 15 | 15 | 15 |
| | | Water | 50 | 50 | 50 | 50 | 50 |

TABLE VII—Continued

Silica-Polymer Masterbatch
(Parts by wt.)

| Example | | | 15 | 16 | 17 | 18 | 19 |
|---|---|---|---|---|---|---|---|
| | (b) | Reagent Aqueous Solution | | | | | |
| | | 2% Aluminum sulfate (1) | 55 | — | — | — | — |
| | | 2% Zinc sulfate | — | 45 | — | — | — |
| | | 2% Sulfuric acid | — | — | 25.5 | — | — |
| | | 2% Calcium chloride | — | — | — | — | 39 |
| | | Silica slurry pH | 5.0 | 6.5 | 7.0 | 8.5 | 7.5 |
| | (c) | Treated Silica Pigment | | | | | |
| | | Filtered (X) | X | X | X | X | X |
| | | Filter cake | 12.3 | 128.3 | 134 | 154 | 121 |
| | (d) | Oleophilic Amine Material | | | | | |
| | | Armeen T(2) | 0.8 | 1.5 | — | — | — |
| | | Duomeen T(3) | — | — | 0.9 | 1.5 | 1.0 |
| | | Benzene | 40 | 40 | 40 | 40 | 40 |
| | (e) | Blending (c) and (d) Blender(4), Min. | 0.5 | 0.5 | 0.5 | 0.5 | 0.5 |
| (B) | | Polymer Solution | | | | | |
| | (a) | Polymer | | | | | |
| | | Isobutylene-isoprene(5) | 30 | — | — | — | — |
| | | Butadiene-styrene(6) | — | 30 | — | — | 30 |
| | | Ethylene-propylene terpolymer(7) | — | — | 30 | 30 | — |
| | (b) | Solvent | | | | | |
| | | Hexane | 132 | 170 | 270 | 132 | 132 |
| | | Antioxidant(8) | 0.6 | 0.6 | 0.6 | 0.6 | 0.6 |
| | (c) | Solvation Conditions | | | | | |
| | | Temp. °C. | 60 | 60 | 60 | 60 | 60 |
| | | Time agitated, hrs. | 12 | 12 | 12 | 12 | 12 |
| (C) | | Blending (A) plus (B) Blender,(4) min. | 0.5 | 0.5 | 0.5 | 0.5 | 0.5 |
| (D) | | Solvent Removal(9) | | | | | |
| | | Boiling water (X) | X | X | X | X | X |
| | | Silica separation into water phase | none | none | none | none | none |
| (E) | | Masterbatch Dried (105°C.) (X) | X | X | X | X | X |

(1)Aluminum sulfate $Al_2(SO_4)_3 \cdot 14H_2O$.
(2)Armeen T (a trademark product) tallow amine.
(3)Duomeen T (a trademark product) N-tallow trimethylene diamine.
(4)Waring blender (a trademark product).
(5)Butyl rubber 268, (a trademark product).
(6)Solprene 300, (a trademark product) a normal viscosity, non-staining, solution polymerized random 75/25 copolymer of butadiene and styrene.
(7)Nordel 1320, (a trademark product) a terpolymer of ethylene, propylene and a non-conjugated diene.
(8)The antioxidant is 2,2-methylene-bis(4-methyl-6-t.-butylphenol)
(9)The silica-solvated polymer combination is dropped into boiling water to vaporize the solvent and the polymer-silica masterbatch is recovered and dried.

TABLE VIII

Silica-Polymer Masterbatch
Including Carbon Black
(Parts by wt.)

| Example | | 20 | 21 | 22 | 23 | 24 |
|---|---|---|---|---|---|---|
| (A) | Silica Pigment Slurry | | | | | |
| | Alkaline silica pigment-I | | | | | |
| | pH = 8.5–9.5 | 25 | 25 | 25 | 25 | 25 |
| | Dry solids basis | 2.5 | 2.5 | 2.5 | 2.5 | 2.5 |

TABLE VIII—Continued

Silica-Polymer Masterbatch
Including Carbon Black
(Parts by wt.)

| Example | | 20 | 21 | 22 | 23 | 24 |
|---|---|---|---|---|---|---|
| (B) | Reagent-Aqueous Solution | | | | | |
| | 2% Aluminum sulfate[1] | 8.5 | — | — | — | — |
| | 2% Calcium chloride | — | 5.0 | — | — | — |
| | 2% Zinc sulfate | — | — | 6.8 | — | — |
| | 2% Magnesium sulfate | — | — | — | 5.0 | — |
| | 2% Sulfuric acid | — | — | — | — | 4.5 |
| (C) | Combine (A) and (B) Blend[2], min. | 0.5 | 0.5 | 0.5 | 0.5 | 0.5 |
| (D) | Oleophilic Amine Material | | | | | |
| | 20% Stearylamine* | 1.0 | — | — | — | — |
| | 20% Cocoamine* | — | 0.5 | — | — | — |
| | 20% Dicocoamine* | — | — | 0.5 | — | — |
| | 20% Rosin amine* | — | — | — | 0.5 | 0.5 |
| (E) | Combine (C) and (D) Blend[2], min. | 0.5 | 0.5 | 0.5 | 0.5 | 0.5 |
| (F) | Carbon Black and/or Processing Oil | | | | | |
| | Philblack O[3] | 5 | 5 | 5 | 5 | 5 |
| | Sundex 2XH[3] | 1 | — | — | — | — |
| (G) | Combine (E) and (F) Blend[2], min. | 0.5 | 0.5 | 0.5 | 0.5 | 0.5 |
| (H) | Polymer Solution | | | | | |
| | 18.2% Isobutylene-isoprene copolymer in hexane[4] | 55 | 55 | — | — | — |
| | 10% Butadiene-styrene copolymer in hexane[5] | — | — | 100 | 100 | — |
| | 10% Ethylene-propylene terpolymer in hexane[6] | — | — | — | — | 100 |
| | Dry solids basis | 10 | 10 | 10 | 10 | 10 |
| | Antioxidant[7] | 0.2 | 0.2 | 0.2 | 0.2 | 0.2 |
| (I) | Combine (G) and (H) Blend[2], min. | 0.5 | 0.5 | 0.5 | 0.5 | 0.5 |
| (J) | Solvent Removal[8] | | | | | |
| | Boiling water (X) | X | X | X | X | X |
| | Silica separation in serum | none | none | none | none | none |
| (K) | Masterbatch Dried (105°C.) (X) | X | X | X | X | X |

*In solution in benzene.
[1] Aluminum sulfate $Al_2(SO_4)_3 \cdot 14H_2O$.
[2] Waring blender, a trademark product.
[3] A trademark product.
[4] Butyl rubber 268, (a trade mark product).
[5] Solprene 300, (a trademark product) a normal viscosity, non-staining, solution polymerized random 75/25 copolymer of butadiene and styrene.
[6] Nordel 1320, (a trademark product) a termpolymer of ethylene, propylene and a non-conjugated diene.
[7] The antioxidant is 2,2-methylene-bis(4-methyl-6-t.-butylphenol).
[8] The silica-solvated polymer combination is dropped into boiling water to vaporize the solvent and the silica-carbon black-polymer masterbatch is recovered and dried.

TABLE VIII-A

Polymer-Silica Masterbatch
(Parts by wt.)

| Example 24 | | A | B | C | D |
|---|---|---|---|---|---|
| (A) | Silica Pigment Slurry | | | | |
| | Alkaline silica pigment-I (pH 9.0) | 29.4 | 29.4 | 29.4 | 29.4 |
| | Dry solids basis | 5 | 5 | 5 | 5 |
| | Water | 15 | 15 | 15 | 15 |
| (B) | Reagent-Aqueous Solution | | | | |
| | 2% sulfuric acid | 15 | 15 | — | — |
| | Treated silica pH | 4.0 | 4.0 | — | — |
| | Filtered (X) | X | X | — | — |
| | Filter cake | | | | |
| | Dry solids, % | 12.2 | 12.2 | — | — |
| | Quantity, wet wt. | 41 | 41 | — | — |
| | Water | 10 | 10 | 10 | 10 |

TABLE VIII-A—Continued

Polymer-Silica Masterbatch
(Parts by wt.)

| Example 24 | | A | B | C | D |
|---|---|---|---|---|---|
| (C) | Oleophilic Imidazoline Compound in Isopropanol | | | | |
| | 10% Varine O[1] | 1 | — | — | — |
| | 10% Finazolene MS[2] | — | 1 | — | — |
| | 10% Finazolene S acetate[3] | — | — | 1 | — |
| | 10% Finazolene CY sulfate[4] | — | — | — | 1 |
| (D) | Polymer Latex | | | | |
| | Butadiene-styrene[5] | 55.5 | 55.5 | 55.5 | 55.5 |
| | Dry solids basis | 10 | 10 | 10 | 10 |
| | Antioxidant[6] | 0.2 | 0.2 | 0.2 | 0.2 |
| | Water | 50 | 50 | 50 | 50 |
| (E) | Coagulant-Aqueous Solution | | | | |
| | 2% sulfuric acid | 7 | 6 | 13 | — |
| | Sat. sodium chloride | 7 | 6 | 13 | — |
| | 2% aluminum sulfate[7] | — | — | — | 25 |
| (F) | Coagulation | | | | |
| | Added coagulant to treated silica + polymer latex (X) | X | X | X | X |
| | pH serum | 5.5 | 5.5 | 4.5 | 4.0 |
| | Silica in serum | none | none | none | none |
| (G) | Masterbatch | | | | |
| | Filtered and washed (X) | X | X | X | X |
| | Dried (105°C.) (X) | X | X | X | X |

[1]Varine O, a trademark product, oleic hydroxyethyl imidazline.
[2]Finazolene MS, a trademark product, an imidazolene baed on soya fatty acids produced by Finetex Inc., Paterson, N.J.
[3]5 parts by wt. Finazolene T, a trademark product, an imidazoline based on stearic acid, 2.5 pts. by wt. of 10% aqueous sulfuric acid and 37.2 pts. by wt. of water and mix until solution clear.
[5]SBR-1502 (T.S. = 19.0%)
[6]Antioxidant 2,2'-methylene-bis(4-methylene-6-t.-butylphenol).
[7]$Al_2(SO_4)_3 \cdot 14H_2O$

TABLE VIII-B

Polymer-Silica Masterbatch
(Parts by wt.)

| Example 24- | | E | F | G |
|---|---|---|---|---|
| (A) | Silica Pigment Slurry | | | |
| | Alkaline silica pigment-I (pH 9.0) | 29.4 | 29.4 | 29.4 |
| | Dry solids basis | 5 | 5 | 5 |
| | Water | 15 | 15 | 15 |
| (B) | Reagent-Aqueous Solution | | | |
| | 2% aluminum sulfate[1] | 31 | — | — |
| | 2% zinc sulphate | — | 25 | — |
| | 2% calcium chloride | — | — | 14 |
| | Treated silica slurry pH | 5.0 | 6.4 | 6.8 |
| | Filtered (X) | X | X | X |
| | Filter cake | | | |
| | Dry solids, % | 16.8 | 17.2 | 17.0 |
| | Quantity, wet wt. | 30 | 29 | 29 |
| | Water | 15 | 15 | 15 |
| (C) | Oleophilic Imidazoline Compound in Isopropanol | | | |
| | 10% Varine C[2] | 1 | — | — |
| | 10% Varine T[3] | — | 1 | — |
| | 10% Varine Cl[4] | — | — | 1 |
| (D) | Polymer Latex | | | |
| | Butadiene-styrene[5] | 55.5 | 55.5 | 55.5 |
| | Dry solids basis | 10 | 10 | 10 |
| | Antioxidant[6] | 0.2 | 0.2 | 0.2 |
| | Water | 50 | 50 | 50 |
| (E) | Coagulant-Aqueous Solution | | | |
| | 2% aluminum sulfate[1] | 25 | — | — |
| | 2% zinc sulfate | — | 20 | — |
| | 2% calcium chloride | — | — | 25 |
| (F) | Coagulation | | | |
| | Added coagulant to treated silica + Polymer latex (X) | X | X | X |
| | pH serum | 4.5 | 6.2 | 7.0 |
| | Silica in serum | none | none | none |

TABLE VIII-B—Continued

Polymer-Silica Masterbatch
(Parts by wt.)

| Example 24- | E | F | G |
|---|---|---|---|
| (G) Masterbatch | | | |
| Filtered and washed (X) | X | X | X |
| Dried (105°C.) (X) | X | X | X |

(1) $Al_2(SO_4)_3 \cdot 14H_2O$
(2) Varine C (100% active), a trademark product*, coco hydroxyethyl imidazoline.
(3) Varine T (100% active), a trademark product*, tall oil hydroxyethyl imidazoline.
(4) Varine Cl (100% active), a trademark product*, dicoco imidazoline.
(5) SER-1502 (T.S. = 19.0%)
(6) Antioxidant 2,2'-methylene-bis(4-methylene-6-t.-butylphenol).

TABLE VIII-C

Treated Silica Pigment
(Parts by wt.)

| Example 24- | H | I | J | K |
|---|---|---|---|---|
| (A) Treated Silica Slurry | | | | |
| (a) Alkaline Silica Pigment-I | | | | |
| Quantity, wet | 20 | 20 | 20 | 20 |
| Dry solids basis | 2.5 | 2.5 | 4.5 | 2.5 |
| pH | 9 | 9 | 9 | 9 |
| (B) Reactant-Aqueous Solution | | | | |
| 2% aluminum sulfate(1) | 8.5 | — | — | — |
| 2% sulfuric acid | — | 4.5 | — | — |
| 2% zinc sulfate | — | — | 7.5 | — |
| 2% calcium chloride | — | — | — | 5.1 |
| (C) Combined (A) and (B) | | | | |
| Blend (X) | X | X | X | X |
| Filter and wash (X) | X | X | X | X |
| Filter cake | | | | |
| Dry solids, % | 16.8 | 12.2 | 17.2 | 17.0 |
| Quantity, wet wt. | 14.9 | 20.5 | 14.5 | 14.7 |
| Dry wt. | 2.6 | 2.5 | 2.5 | 2.5 |
| (D) Oleophilic Imidazoline Compound in Isopropanol | | | | |
| 10% Finazolene TA(2) | 1.0 | — | — | — |
| 10% Varine T(3) | — | 0.75 | — | — |
| 10% Varine Cl(3) | — | — | 1.0 | — |
| 10% Varine O(3) | — | — | — | 0.5 |
| (E) Combine (C) and (D) | | | | |
| Blend (X) | X | X | X | X |
| (F) Carbon Black | | | | |
| Philblack O(4) | 1.5 | 2.0 | — | — |
| (G) Processing Oil | | | | |
| Circosol 2XH(4) | — | 1.0 | — | — |
| (H) Combine (E) with (F) and/or (G) | | | | |
| Blend (X) | X | X | — | — |
| Wet product, wt. | 16.5 | 23.5 | 14.6 | 14.7 |
| (I) Dry Treated Silica | | | | |
| Dry at 105°C. (X) | X | X | X | X |
| Dry Product, wt. | 4.1 | 5.5 | 2.6 | 2.5 |

(1) $Al_2(SO_4)_3 \cdot 14H_2O$
(2) A modified amino ethyl imidazoline based on tallow.
(3) See footnotes Table I
(4) A trademark product Table IX, Examples 25 to 28, exemplify the treatment of wet silica pigment with oleophilic quaternary ammonium compounds and these so treated silicas are especially suitable for elastomer latex masterbatching. The quaternary ammonium treated silicas when dried are also useful in preparing masterbatches from elastomer solvent solutions.

Table X, Examples 29 to 31, and Table XI, Examples 32 to 34, further exemplify the preparation of oleophilic quaternary ammonium treated silicas and the masterbatching with various elastomer latices.

Table XII, Examples 35 to 38, exemplify the blending and interaction of oleophilic quaternary ammonium treated wet silica and carbon black and/or processing oil and the formation of masterbatches with various polymer latices.

Tables IX, X, XI, and XII correspond to Tables X, V, VII and XII, respectively, of applicant's concurrently filed U.S. Pat. application and for further examples reference may be made to Examples 1 to 6, 10 to 12, 16 to 22, 27 to 22, 27 30, and 35 to 46 of said application herein incorporated by reference.

TABLE IX

Dispersible Silica
(Parts by wt.)

| Example | | 25 | 26 | 27 | 28 |
|---|---|---|---|---|---|
| (A) | Silica Slurry | | | | |
| | Alkaline silica pigment-I (pH 8.5) | 150 | 150 | 150 | 150 |
| | Dry solids basis | 15 | 15 | 15 | 15 |
| | Water | 50 | 50 | 50 | 50 |
| (B) | Reagent Aqueous Solution | | | | |
| | 2% aluminum sulfate[1] | 18 | — | — | 19 |
| | 2% zinc sulfate | — | 20 | — | — |
| | 2% sulfuric acid | — | — | 8.5 | 4.5 |
| | Silica slurry, pH | 5.0 | 6.5 | 7.0 | 6.0 |
| (C) | Oleophilic Quaternary Ammonium Compound | | | | |
| | Arquad C-50[1] | 1.0 | 2.0 | — | — |
| | Arquad T-50[2] | — | — | 1.5 | 3.0 |
| (D) | Treated Silica Pigment | | | | |
| | (a) Filtered (X) | X | X | X | X |
| | (b) Dried (105°C.) (X) | X | X | X | X |

[1] Arquad C-50 - Cocotrimethyl quaternary ammonium chloride 50% active, a trademark product, in isopropanol.
[2] Arquad T-50 - tallow-trimethyl quaternary ammonium chloride 50% active, a trademark product, in isopropanol.
(a) Provides treated wet silica suitable for masterbatching and in selected combination with (b) dry silica provides composition suitable for beading.
(b) The dry treated silica is especially suitable for solution masterbatching, however, after dispersing in water such silica can be employed for latex materbatching.

TABLE X

Polymer-Silica Masterbatch
(Parts by wt.)

| Example | | 29 | 30 | 31 |
|---|---|---|---|---|
| (A) | Silica Pigment Slurry | | | |
| | Alkaline silica pigment-I (pH 8.5) | 150 | 150 | 150 |
| | Dry solids basis | 15 | 15 | 15 |
| | Water | 50 | 50 | 50 |
| (B) | Reagent-Aqueous Solution | | | |
| | 10% sulfuric acid | 5.1 | 5.1 | 5.1 |
| | Silica slurry, pH* | 7 | 7 | 7 |
| | *filter cake after washing. | | | |
| (C) | Oleophilic Quaternary Ammonium Compound | | | |
| | 10% Arquad S-50[1] | 3.0 | 3.0 | 3.0 |
| (D) | Polymer Latex | | | |
| | Butadiene-styrene[2] | 153 | 153 | 153 |
| | Dry solids basis | 30 | 30 | 30 |
| | Antioxidant[3] | 0.6 | 0.6 | 0.6 |
| | Water | 150 | 150 | 150 |
| (E) | Coagulant-Aqueous Solution | | | |
| | 2% aluminum sulfate[4] | 100 | — | — |
| | 2% calcium chloride | — | 80 | — |
| | 2% sulfuric acid | — | — | 40 |
| | Water | 500 | 500 | 500 |
| (F) | Coagulation | | | |
| | Treated silica, polymer latex and then coagulant were continuously combined (X) | X | X | X |
| | pH serum | 4.5 | 6.8 | 3.5 |
| | Silica in serum | none | none | none |
| (G) | Masterbatch | | | |
| | Filtered and washed (X) | X | X | X |
| | Dried (105°C.) (X) | X | X | X |

[1] Arquad S-50, a trademark product, soya trimethyl ammonium chloride, 50% active, in isopropanol.
[2] SBR-1502 (T.S. = 19.7%).
[3] Antioxidant is 2,2-methylene-bis(4-methyl-6-t.-butylphenol).
[4] Aluminum sulfate = $Al_2(SO_4)_3 \cdot 14H_2O$.

TABLE XI

Polymer-Silica Masterbatch
(Parts by wt.)

| Example | | 32 | 33 | 34 |
|---|---|---|---|---|
| (A) | Silica Pigment Slurry | | | |
| | Alkaline silica pigment-I (pH 8.5) | 150 | 150 | 150 |
| | Dry solids basis | 15 | 15 | 15 |
| | Water | 50 | 50 | 50 |
| (B) | Reagent-Aqueous Solution | | | |
| | 10% sulfuric acid | 5.1 | 5.1 | 51 |
| | Silica slurry, pH* | 7 | 7 | 7 |
| | *filter cake after washing. | | | |
| (C) | Oleophilic Quaternary Ammonium Compound | | | |
| | 10% Arquad 2C-75[1] | 2 | 2 | 2 |
| (D) | Polymer Latex | | | |
| | Butadiene-acrylonitrile[2] | 63 | — | — |
| | Butadiene-acrylonitrile[3] | — | 61 | — |
| | Chloroprene[4] | — | — | 43 |
| | Dry solids basis | 25 | 25 | 25 |
| | Antioxidant[3] | 0.5 | 0.5 | 0.5 |
| | Water | 180 | 180 | 180 |
| (E) | Coagulant-Aqueous Solution | | | |
| | 2% aluminum sulfate[5] | 100 | 85 | 75 |
| | Water | 500 | 500 | 500 |
| (F) | Coagulation | | | |
| | Added treated silica plus polymer latex to coagulant (X) X | X | X | |
| | pH serum | 4.0 | 4.0 | 4.0 |
| | Silica in serum | none | none | none |
| (G) | Masterbatch | | | |
| | Filtered and washed (X) | X | X | X |
| | Dried (105°C.) (X) | X | X | X |
| | *Masterbatch balled-up. | | | |

[1] Arquad 2C-75, a trademark product, dicoco dimethyl ammonium chloride, in isopropanol.
[2] Hycar 1570 X 20, a trademark product which is a carboxyl-modified butadiene/acrylonitrile latex.
[3] Hycar 1561, a trademark product which is a butadiene/acrylonitrile latex.
[4] Neoprene 635 latex, a trademark product.
[5] Aluminum sulfate = $Al_2(SO_4)_3 \cdot 14H_2O$.

TABLE XII

Polymer-Silica Masterbatch Including Carbon Black and Processing Oil
(Parts by wt.)

| Examples | | 35 | 36 | 37 | 38 |
|---|---|---|---|---|---|
| (A) | Silica Pigment Slurry | | | | |
| | Alkaline silica pigment-I pH 8.5–9.5 | 25 | 25 | 25 | 25 |
| | Dry basis | 2.5 | 2.5 | 2.5 | 2.5 |
| | Water | 60 | 60 | 60 | 60 |
| (B) | Reagent Aqueous Solution | | | | |
| | 2% Aluminum sulfate[1] | 8.5 | 8.5 | — | — |
| | 2% Calcium chloride | — | — | '5.0 | 5.0 |
| (C) | Oleophilic Quaternary Ammonium Compound | | | | |
| | Arquad 2C-75[2] | 0.15 | 0.15 | — | — |
| | Arquad C-50[3] | — | — | 0.1 | 0.1 |
| (D) | Combine (A) and (B) then (C) | | | | |
| | Blend, Min. | 0.5 | 0.5 | 0.5 | 0.5 |
| (E) | Carbon Black and/or Processing Oil | | | | |
| | Philblack O[5] | 2.5 | 2.5 | 2.5 | 2.5 |
| | Sundex 2XH[5] | 1 | — | — | — |
| (F) | Combine (D) and (E) | | | | |
| | Blend[4], Min. | 0.5 | 0.5 | 0.5 | 0.5 |
| (G) | Polymer Latex | | | | |
| | Polychloroprene[6] | 17.3 | — | — | — |
| | Butadiene-acrylonitrile[7] | — | 24.4 | — | — |
| | Butadiene-styrene[8] | — | — | 50.6 | 50.6 |
| | Dry Solids | 10 | 10 | 10 | 10 |
| | Water | 80 | 30 | 30 | 30 |
| | 28% Ammonia, aqueous | 1 | — | — | — |
| | Antioxidant[9] | 0.2 | 0.2 | 0.2 | 0.2 |

TABLE XII—Continued

Polymer-Silica Masterbatch
Including Carbon Black and Processing Oil

| Examples | (Parts by wt.) 35 | 36 | 37 | 38 |
|---|---|---|---|---|
| (H) Combine (F) and (G) Blender[4], Min. | 1 | 1 | 1 | 1 |

[1] Aluminum sulfate Al$_2$(SO$_4$)$_3$·14A$_2$O
[2] Arquad 2C-75, a trademark product, dicoco dimethyl ammonium chloride, 75% active.
[3] Arquad C-50, a trademark product, coco trimethyl ammonium chloride, 50% active.
[4] Waring blender (a trademark product)
[5] A trademark product.
[6] Neoprene 635 latex, a trademark product (TS 58%).
[7] Hycar 1561, a butadiene/acrylonitrile latex, a trademark product, (TS=41%).
[8] SBR-1500 (TS=19.7%).
[9] Antioxidant is 2,2'-methhylene-bis-(4-methyl-6-t.-butyl phenol).

Table XIII, Examples 39–42, teach the treatment of wet silica with various reactants selected from the water soluble alkaline earth salts and oleophilic quaternary ammonium compounds. The so treated wet silica pigments are combined with elastomer solution and on removal of the solvent the masterbatch is formed.

Table XIV, Examples 43 to 47, teach the treatment of wet silica with various reactants of the selected classes and the further treatment of the said silica with quaternary ammonium compounds and combined with elastomer solvent solutions and the solvent removed to yield masterbatches.

Tables XIII and XIV correspond to tables V and VIII, respectively, of applicant's concurrently filed U.S. Pat. application and for further examples reference may be made to Examples 1 to 9, 14 to 21, and 27 of said application herein incorporated by reference, and to Tables XIV-A and XIV-B herein.

TABLE XIII

Solution Polymer-Treated Silica Masterbatch

| Example | | (Parts by wt.) 39 | 40 | 41 | 42 |
|---|---|---|---|---|---|
| (A) | Silica Pigment Treated-Quaternary Ammonium Material | | | | |
| | (a) Silica Pigment Aqueous Slurry Alkaline silica pigment-I (pH = 8.5–9.5) | 150 | 150 | 150 | 150 |
| | Dry solids basis | 15 | 15 | 15 | 15 |
| | Water | 50 | 50 | 50 | 50 |
| | (b) Reactant Aqueous Solution | | | | |
| | 2% Calcium chloride | 35 | — | — | — |
| | 2% Barium chloride | — | 60 | — | — |
| | 2% Magnesium sulfate | — | — | 35 | — |
| | 2% Ammonium aluminum | — | — | — | 85 |
| | Silica slurry pH | 8.0 | 8.6 | 8.6 | 5.0 |
| | (c) Treated Silica Pigment Filtered (X) | X | X | X | X |
| | Filter cake | 121 | 120 | 120 | 119 |
| | (d) Oleophilic-Quaternary Ammonium Type Material | | | | |
| | 10% Hyamine 1622[1] | 9.0 | — | — | 9.0 |
| | 10% Arquad S[2] | — | — | 9.0 | — |
| | 10% Arquad C[3] | — | 12.0 | — | — |
| | (e) Blending (c) and (d) Blender[4], min. | 0.2 | 0.2 | 0.2 | 0.2 |
| (B) | Polymer Solution | | | | |
| | (a) Polymer Isobutylene-isoprene[5] | 30 | 30 | 30 | 30 |
| | (b) Solvent Hexane | 132 | 132 | 132 | 132 |
| | Antioxidant[6] | 0.6 | 0.6 | 0.6 | 0.6 |
| | (c) Solvation Conditions Temperature °C. | 60 | 60 | 60 | 60 |
| | Time agitated, hrs. | 12 | 12 | 12 | 12 |
| (C) | Blending (A) plus (B) Blender[4], min. | | | | |
| (D) | Solvent Removal[7] Boiling water (X) | X | X | X | X |
| | Silica separation into water phase | None | None | None | None |
| (E) | Masterbatch Dried (105°C.) (X) | X | X | X | X |

[1] Hyamine 1622 (a trademark product) diisobutyl phenoxy-ethoxyethyl dimethyl benzyl ammonium chloride monohydrate, in isopropanol.
[2] Arquad S (a trademark product) soya trimethyl ammonium chloride in isopropanol.
[3] Arquad C (a trademark product) coco trimethyl ammonium chloride in isopropanol.
[4] Waring blender (a trademark product).
[5] Butyl rubber, a trademark product.
[6] The antioxidant is 2,2'-methylene-bis (4-methyl-6-t.-butylphenol).
[7] The silica-solvated polymer masterbatch is dropped into boiling water to vaporize the solvent and the polymer-silica masterbatch is recovered and dried.

TABLE XIV

Solution Polymer-Treated Silica Masterbatch
Including Carbon Black and Processing Oil

| Example | | (Parts by wt.) 43 | 44 | 45 | 46 | 47 |
|---|---|---|---|---|---|---|
| (A) | Silica Pigment Slurry Alkaline silica pigment-I | | | | | |
| | pH=8.5–9.5 | 25 | 25 | 25 | 25 | 25 |
| | Dry basis | 2.5 | 2.5 | 2.5 | 2.5 | 2.5 |
| | Water | | | | | |
| (B) | Reactant-Aqueous Solution | | | | | |
| | 2% Aluminum sulfate[1] | 8.5 | — | — | — | — |
| | 2% Calcium chloride | — | 5.0 | — | — | — |
| | 2% Zinc sulfate | — | — | 6.8 | — | — |
| | 2% Magnesium sulfate | — | — | — | 5.0 | — |
| | 2% Sulfuric acid | — | — | — | — | 4.5 |
| (C) | Combine (A) and (B) and filter (X) | X | X | X | X | X |
| (D) | Oleophilic Quaternary Ammonium Material | | | | | |
| | 20% Aqueous Hyamine 1622[2] | 1.0 | — | — | — | — |
| | 20% Redicote E-11*[3] | — | 0.5 | — | — | — |
| | 10% Arquad C*[4] | — | — | 0.5 | — | — |
| | 10% Arquad T*[5] | — | — | — | 0.5 | — |
| | 10% Arquad 18*[6] in isopropanol | — | — | — | — | 1.0 |
| (E) | Carbon Black and Processing Oil | | | | | |
| | Philblack O[7] | 5 | 5 | 5 | 5 | 5 |
| | Sundex 2XH[7] | 1 | — | — | — | — |
| (F) | Combine (C) and (D) then (E) | | | | | |
| | Blender[8], min. | 0.5 | 0.5 | 0.5 | 0.5 | 0.5 |
| (G) | Polymer Solution in Hexane | | | | | |
| | 18.5% Isobutylene-isoprene[8] | 81 | 81 | — | — | — |
| | 10% Butadiene-styrene[9] | — | — | 150 | 150 | — |
| | 10% Ethylene-propylene terpolymer[10] | — | — | — | — | 150 |
| | Dry solids basis | 15 | 15 | 15 | 15 | 15 |
| | Hexane | 66 | 66 | 135 | 135 | 135 |
| | Antioxidant[11] | 0.3 | 0.3 | 0.3 | 0.3 | 0.3 |
| (H) | Combine (F) and (G) | | | | | |
| | Blender[8], min. | 0.5 | 0.5 | 0.5 | 0.5 | 0.5 |
| (I) | Solvent Removal[12] | | | | | |
| | Boiling water (X) | X | X | X | X | X |
| | Silica and/or black separation into water phase | None | None | None | None | None |
| (J) | Masterbatch Dried (105°C.) | (X) X | X | X | X | X |

[1]Aluminum sulfate $Al_2(SO_4)_3 \cdot 14H_2O$.
[2]A trademark product, diisobutyl phenoxyethoxyethyl dimethyl benzyl ammonium chloride.
[3]A trademark product.
[4]Coco trimethyl ammonium chloride.
[5]Tallow trimethyl ammonium chloride.
[6]Octadecyl trimethyl ammonium chloride.
[7]A trademark product.
[8]Waring blender, a trademark product.
[9]Butyl rubber 268, a trademark product.
[10]Solprene 300, a trademark product, a normal viscosity, non-staining, solution polymerized random 75/25 copolymer of butadiene and styrene.
[11]Nardel 1320, a trademark product, a terpolymer of ethylene, propylene and a non-conjugated diene.
[12]Antioxidant 2,2'-methylene-bis(4-methylene-6-t.-butylphenol).
[13]The silica-black-solvated polymer masterbatch is dropped into boiling water to vaporize the solvent and the polymer-silica masterbatch is recovered and dried.

TABLE XIV-A

Polymer-Silica Masterbatch

| Example 58 | | (Parts by wt.) A | B | C | D | E |
|---|---|---|---|---|---|---|
| (A) | Treated Silica Slurry (a) Alkaline Silica Pigment-I | | | | | |
| | Quantity, wet | 20 | 20 | 20 | 20 | 20 |
| | Dry solid basis | 2.5 | 2.5 | 2.5 | 2.5 | 2.5 |
| | pH | 9 | 9 | 9 | 9 | 9 |

TABLE XIV-A—Continued

Polymer-Silica Masterbatch

| Example 58 | | (Parts by wt.) A | B | C | D | E |
|---|---|---|---|---|---|---|
| (B) | Reactant-Aqueous Solution | | | | | |
| | 2% aluminum sulfate[1] | 8.5 | 8.5 | — | — | — |
| | 2% sulfuric acid | — | — | 4.5 | 4.5 | — |
| (C) | Combine (A) and (B) | | | | | |
| | Blend (X) | X | X | X | X | — |
| | Filtered and wash (X) | X | X | X | X | — |
| | Filter Cake | | | | | |
| | Dry solids % | 16.8 | 16.8 | 12.2 | 12.2 | 12.5 |
| | Quantity, wet wt. | 14.9 | 14.9 | 20.5 | 20.5 | 20.0 |
| (D) | Oleophilic Quaternary Ammonium Compound in Isopropanol | | | | | |
| | 10% Monaquat CIBC[2] | 1 | 1.5 | — | — | — |
| | 10% Monaquat TIBC[3] | — | — | 1.5 | 1.0 | 0.75 |
| (E) | Combine (A) and (B) | | | | | |
| | Blend, (X) | X | X | X | X | X |
| (F) | Polymer Latex | | | | | |
| | Butadiene-styrene[4] | 26.2 | 26.2 | 26.2 | 26.2 | 26.2 |
| | Dry solids basis | 5 | 5 | 5 | 5 | 5 |
| | Antioxidant[5] | 0.1 | 0.1 | 0.1 | 0.1 | 0.1 |
| | Water | 25 | 25 | 25 | 25 | 25 |
| (G) | Coagulant-Aqueous Solution | | | | | |
| | 2% sulfuric acid | 4 | 4 | 4 | — | — |
| | Sat. sodium chloride | 4 | 4 | 4 | — | — |
| | 2% aluminum sulfate[6] | — | — | — | 8 | 16 |
| (F) | Coagulation | | | | | |
| | Added coagulant to treated silica + polymer latex (X) | X | X | X | X | X |
| | pH serum | 5.5 | 5.5 | 4.5 | 4.5 | 4.5 |
| | Silica in serum | none | none | none | none | none |
| (G) | Masterbatch | | | | | |
| | Filtered and washed (X) | X | X | X | X | X |
| | Dried (105°C.) (X) | X | X | X | X | X |

[1] $Al_2(SO_4)_3 \cdot 14H_2O$
[2] A trademark product, a substituted imidazoline of coconut fatty acid quaternized with benzyl chloride.
[3] A trademark product, a substituted imidazoline of tall oil quaternized with benzyl chloride.
[4] SBR-1502 (T.S. = 19.0%)
[5] Antioxidant 2,2'-methylene-bis(4-methylene-6-t.-butylphenol).
[6] $Al_2(SO_4)_3 \cdot 14H_2O$

TABLE XIV-B

Treated Silica Pigment

| Example 58 | | (Parts by wt.) F | G | H | I | J |
|---|---|---|---|---|---|---|
| (A) | Treated Silica Slurry | | | | | |
| | (a) Alkaline Silica Pigment-I | | | | | |
| | Quantity, wet | 20 | 20 | 20 | 20 | 20 |
| | Dry solids basis | 2.5 | 2.5 | 2.5 | 2.5 | 2.5 |
| | pH | 9 | 9 | 9 | 9 | 9 |
| (B) | Reactant-Aqueous Solution | | | | | |
| | 2% aluminum sulfate[1] | 8.5 | — | — | — | — |
| | 2% sulfuric acid | — | 4.5 | — | — | — |
| | 2% zinc sulfate | — | — | 7.5 | — | — |
| | 2% calcium sulfate | — | — | — | 5.1 | — |
| | 2% magnesium sulfate | — | — | — | — | 6.0 |
| (C) | Combine (A) and (B) | | | | | |
| | Blend (X) | X | X | X | X | X |
| | Filter and wash (X) | X | X | X | X | X |
| | Filter cake | | | | | |
| | Dry solids | 16.7 | 12.5 | 17.2 | 17.2 | 17.5 |
| | Quantity, wet wt. | 15.0 | 20.2 | 14.5 | 14.5 | 14.3 |
| | Dry, wt. | 2.5 | 2.5 | 2.5 | 2.5 | 2.5 |
| (D) | Oleophilic Quaternary Ammonium Compound in Isopropanol | | | | | |
| | 10% Compound I[2] | 0.9 | — | — | — | — |
| | 10% Compound II[3] | — | 0.7 | — | — | — |
| | 10% Compound III[4] | — | — | 0.5 | — | — |
| | 10% Compound IV[5] | — | — | — | 1.0 | 1.2 |

[1] $Al_2(SO_4)_3 \cdot 14H_2O$.
[2] Hydroxyethyl imidazoline based on stearic acid quaternized with benzyl chloride.
[3] A substituted imidazoline based on oleic acid quaternized with methyl sulfate.
[4] diimidazoline based on triethylene triamine and tall oil quaternized with ethyl sulfate.
[5] dicoco imidazoline quaternized with benzyl chloride.

TABLE XIV-B—Continued

| | | Treated Silica Pigment (Parts by wt.) | | | | |
|---|---|---|---|---|---|---|
| Example 58 | | F | G | H | I | J |
| (E) | Combine (C) and (D) Blend (X) | X | X | X | X | X |
| (F) | Carbon Black Philblack O[6] | 0.5 | — | 1.0 | — | — |
| (G) | Processing Oil Circosol 2XH(6) | — | 0.5 | 0.5 | — | — |
| (H) | Combine (E) with (F) and/or (G) Blend | X | X | X | — | — |
| | Wet product, wt. | 15.5 | 20.7 | 15.0 | 15.4 | 15.4 |
| (I) | Dry Treated Silica 10 Dry at 105°C. (X) | X | X | X | X | X |
| | Dry product, wt. | 3.1 | 3.1 | 4.0 | 2.6 | 2.5 |

[6] A trademark product.

Table XVI, Examples 48 to 51, teach the combining of wet silica pigment with oleophilic carboxylic acid applied in aqueous solution as the sodium salt and precipitated on the silica with aluminum or zinc salts or alkaline earth salts or acid to form the carboxylate salts or free acid. The oleophilic carboxylic acid or carboxylic acid salt treated wet silica is masterbatched with aqueous dispersion of elastomers and coagulated with coagulant.

In Table XVI, Examples 52 to 55, and in Table XVII, Examples 56 to 59, the wet silica is treated with reactant then with oleophilic carboxylic acid and/or salt and the resulting treated silica is blended with elastomer latices and coagulated with reactant coagulant and after separation of the silica-polymer crumb from the aqueous phase the wet masterbatch is dried.

Table XVIII, Examples 60 to 64, exemplify wet silica pigment treated with oleophilic carboxylate and blended with carbon black and/or processing oil which is then blended with elastomer latex and coagulated with metal salts to form the wet masterbatch which is then dried.

Tables XVI, XVII, and XVIII, correspond to Tables IV, VI, and XI, respectively, of applicant's concurrently filed U.S. Pat. application and for further examples reference may be made to said Examples 1 to 4, 9 to 12, 17 to 23, 28 to 31, and 37 to 44 incorporated by reference.

TABLE XV

| | | Dispersible Silica Pigment (Parts by wt.) | | | |
|---|---|---|---|---|---|
| Example | | 48 | 49 | 50 | 51 |
| (A) | Silica Pigment Slurry Alkaline silica pigment-I (pH 9.5–9.5) | 150 | 150 | 150 | 150 |
| | Dry solids basis | 15 | 15 | 15 | 15 |
| | Water | 50 | 50 | 50 | 50 |
| (B) | Oleophilic Carboxylate-Aqueous Solution 10% Sodium abietate | 7.5 | 7.5 | 7.5 | 7.5 |
| (C) | Reactant-Aqueous Solution | | | | |
| | 2% Aluminum sulfate[1] | 30 | — | — | — |
| | 2% Zinc sulfate | — | 45 | — | — |
| | 2% Magnesium chloride | — | — | 35 | — |
| | 2% Barium chloride | — | — | — | 65 |
| | 2% Sulfuric acid | 15 | — | — | — |
| (D) | Combine (A) with (B) then add (C) Blend, (X) | X | X | X | X |
| (E) | Treated Silica Pigment | | | | |
| | (a) Filtered and washed (X) | X | X | X | X |
| | (b) Dried (105°C.) (X) | X | X | X | X |

[1] Aluminum sulfate = $Al_2(SO_4)_3 \cdot 14H_2O$.
(a) Provides treated wet silica suitable for masterbatching and in selected combination with (b) dry silica provides composition suitable for beading.
(b) The dry treated silica is especially suitable for solution masterbatching, however, after dispersing in water such silica can be employed for latex masterbatching.

TABLE XVI

| | | Preparation of Tested Silica Slurry (Parts by wt.) | | | |
|---|---|---|---|---|---|
| Example | | 52 | 53 | 54 | 55 |
| (A) | Silica Pigment Slurry Alkaline silica pigment-I | | | | |
| | Quantity, wet | 2000 | 2000 | 2000 | 2000 |
| | Dry solids basis | 200 | 200 | 200 | 200 |
| | pH | 8.5 | 8.5 | 8.5 | 8.5 |
| (B) | Reactant-Aqueous Solution | | | | |
| | 10% Sulfuric acid | — | — | 70 | 70 |
| | pH | — | — | 5.0 | 5.0 |
| | Water | — | — | 150 | 150 |
| (C) | Oleophilic Carboxylate-Aqueous Solution | | | | |
| | 5% sodium stearate | 200 | 200 | 20 | 40 |

TABLE XVI—Continued

Preparation of Tested Silica Slurry

| Example | | 52 (Parts by wt.) | 53 | 54 | 55 |
|---|---|---|---|---|---|
| (D) | Reactant-Aqueous Solution | | | | |
| | 10% Magnesium sulfate | 115 | — | — | — |
| | 10% Barium chloride | — | 180 | — | — |
| | 10% Aluminum sulfate[1] | — | — | 50 | 50 |
| | After reactant added pH | 7.2 | 7.0 | 4.5 | 4.5 |
| (E) | Treated Silica Slurry-Wet Filter Cake | | | | |
| | Filter and wash (X) | X | X | X | X |
| | Filter cake solids, % | 13.5 | 13.4 | 12.5 | 12.4 |

[1]Aluminum sulfate = $Al_2(SO_4)_3 \cdot 14H_2O$.
NOTE: The aqueous alkaline silica slurry was placed in a glass container and moderately agitated, then the water was added followed by the carboxylate solution and then the aqueous reactant solution was added solowly while agitating, except that a part of the selected reactant material was added to the pigment slurry ahead of its combination with the oleophilic carboxylate in Examples 7 and 8.

TABLE XVII

Polymer-Silica Masterbatch

| Example | | 56 (Parts by wt.) | 57 | 58 | 59 |
|---|---|---|---|---|---|
| (A) | Polymer Latex | | | | |
| | Butadiene-styrene[1] | 510 | — | — | — |
| | Chloroprene[2] | — | 173 | — | — |
| | Butadiene-acrylonitrile[3] | — | — | 244 | — |
| | Butadiene-acrylonitrile[4] | — | — | — | 254 |
| | Dry solids basis | 100 | 100 | 100 | 100 |
| | Antioxidant[5] | 2 | 2 | 2 | 2 |
| | Water | 520 | 500 | 500 | 500 |
| (B) | Oleophilic Carboxylate Treated Silica Slurry-Wet Filter Cake Prepared from never dried alkaline silica pigment precipitate in accordance with | | | | |
| | Example 5 (Table IV) | 370 | — | — | — |
| | Example 6 (Table IV) | — | 370 | — | — |
| | Example 7 (Table IV) | — | — | 400 | — |
| | Example 8 (Table IV) | — | — | — | 400 |
| | Dry solids basis | 50 | 50 | 50 | 50 |
| | Water | 200 | 200 | 200 | 200 |
| | 7% Aqueous ammonia | 32 | — | 32 | 32 |
| (C) | Reactant-Aqueous Solution[6] | | | | |
| | 2% Magnesium sulfate | 160 | — | — | — |
| | 2% Barium chloride | — | 280 | — | — |
| | 2% Aluminum sulfate[7] | — | — | 480 | 480 |
| (D) | Coagulation To treated silica (B) plus polymer latex (A) reactant | | | | |
| | (C) was added—(X) | X | X | X | X |
| | pH serum | 7.6 | 8.0 | 6.0 | 6.0 |
| | Silica in serum | None | None | None | None |
| (E) | Masterbatch | | | | |
| | Filter and wash (X) | X | X | X | X |
| | Dried (105°C.) (X) | X | X | X | X |

[1]SBR 1502 (dry solids 19.7%).
[2]Neoprene 635 (dry solids 58%), a trademark product.
[3]Hycar 1561 (dry solids 41.1%), a trademark product.
[4]Hycar 1570 × 20*, a carboxy group containing polymer (dry solids 39.7%). *A trademark product.
[5]The antioxidant is 2,2'-methylene-bis(4-methyl-6-t.-butylphenol).
[6]After combining the polymer latex and treated silica slurry and while moderately agitating the alkali earth metal salt solution was added to complete the coagulation.

TABLE XVIII

Polymer-Silica Masterbatches Including Carbon Black and Processing Oil

| Example | | 60 (Parts by wt.) | 61 | 62 | 63 | 64 |
|---|---|---|---|---|---|---|
| (A) | Silica Pigment Slurry | | | | | |
| | Alkaline silica pigment-I (pH = 8.5–9.5) | 25 | 25 | 25 | 25 | 25 |
| | Dry solids basis | 2.5 | 2.5 | 2.5 | 2.5 | 2.5 |
| | Water | 60 | 60 | 60 | 60 | 60 |
| (B) | Oleophilic Carboxylate-Aqueous Solution | | | | | |
| | 5% sodium tallow soap | 4.0 | — | — | — | — |
| | 5% potassium rosin soap | — | 3.5 | — | — | — |
| | 5% ammonium coco fatty acid soap | — | — | 2.0 | 4.0 | 4.0 |

TABLE XVIII—Continued

| | | Polymer-Silica Masterbatches Including Carbon Black and Processing Oil (Parts by wt.) | | | | |
|---|---|---|---|---|---|---|
| Example | | 60 | 61 | 62 | 63 | 64 |
| (C) | Reactant-Aqueous Solution | | | | | |
| | 2% aluminum sulfate[1] | 19 | 19 | 19 | 23 | 23 |
| | 5.6% aqueous ammonia | — | — | — | 1.0 | 1.0 |
| (D) | Combine (A) and (B) and (C) (X) | X | X | X | X | X |
| (E) | Carbon Black-Processing Oil | | | | | |
| | Philblack O[2] | .5 | — | — | 7.5 | 7.5 |
| | Statex 160 HR[2] | — | 2.5 | 5.0 | — | — |
| | Sundex 2XH[3] | 1.0 | — | — | 1.0 | 1.0 |
| (F) | Combine (D) and (E) | | | | | |
| | Blend[4] (X) | X | X | X | X | X |
| (G) | Polymer Latex | | | | | |
| | Butadiene-styrene[5] | 82 | 55 | 82 | 109 | 109 |
| | Dry solids basis | 15 | 10 | 15 | 20 | 20 |
| | Antioxidant[6] | 0.3 | 0.2 | 0.3 | 0.4 | 0.4 |
| | Water | 85 | 55 | 85 | 110 | 110 |
| (H) | Reactant-Aqueous Solution | | | | | |
| | 2% Aluminum sulfate[1] | 32 | 24 | — | — | — |
| | 2% Zinc sulfate | — | — | 36 | — | — |
| | 2% Calcium chloride | — | — | — | 48 | — |
| | 2% Magnesium sulfate | — | — | — | — | 40 |
| (I) | Combine (F) and (G) then (H) (X) | X | X | X | X | X |
| | pH of serum | 4.5 | 5.5 | 6.8 | 7.0 | 7.5 |
| | Silica and/or black in serum | None | None | None | None | None |
| (J) | Masterbatch | | | | | |
| | Filter and wash (X) | X | X | X | X | X |
| | Dried (105° C.) (X) | X | X | X | X | X |

[1] Aluminum sulfate $Al_2(SO_4)_3 \cdot 14H_2O$.
[2] Carbon black, a trademark product.
[3] Processing oil, a trademark product.
[4] Waring blender, a trademark product.
[5] SBR-1502 latex (TS = 18.4%).
[6] The antioxidant is 2,2'-methylene-bis-(4-methyl-6-t.-butyl phenol).

Table XIX, Examples 65–68, exemplifies the combining of fatty acids and wet silica pigment. Table XX, Examples 69 to 72, exemplifies the acid treated silica being combined with elastomer in solvent solution and the solvent removed to provide the masterbatch.

Table XXI, Examples 73 to 76, exemplify the oleophilic carboxylic treated wet silica combined with carbon black and/or processing oil and further combined with elastomer solution to form a blend which is freed of solvent to form the masterbatch.

Tables XIX, XX, and XXI correspond to Tables VIII, IX, and X, respectively, of applicant's concurrently filed U.S. Pat. application and for further examples reference may be made to Examples 1 to 23 and 36 of said application herein incorporated by reference.

TABLE XIX

| | | Treated Silica Pigment (Parts by wt.) | | | |
|---|---|---|---|---|---|
| Example | | 65 | 66 | 67 | 68 |
| (A) | Treated Silica Slurry | | | | |
| | (a) Alkaline Silica Pigment-I | | | | |
| | Quantity, wet | 1000 | 1000 | 1000 | 1000 |
| | Dry solids basis | 100 | 100 | 100 | 100 |
| | pH | 9.0 | 9.0 | 9.0 | 9.0 |
| (B) | Reactant-Aqueous Solution | | | | |
| | 2% Sulfuric acid | 150 | 150 | — | — |
| | 2% Aluminum sulfate | — | — | 320 | 320 |
| (C) | Oleophilic Carboxylate Material Solvent Solution | | | | |
| | Rosin acids (hydrogenated)[1] | 15 | — | — | — |
| | Tallow fatty acids | — | 20 | — | — |
| | Naphthenic acids[2] | — | — | 10 | — |
| | Cocoa fatty acid[3] | — | — | — | 8 |
| | Hexane | 35 | — | — | — |
| | Benzene | — | 25 | 20 | 8 |
| (D) | Blend (A) and (B) then (C) | | | | |
| | Blender, min.[4] | 0.5 | 0.5 | 0.5 | 0.5 |
| | 28% Aqueous ammonia | — | — | 0.2 | 0.2 |

TABLE XIX—Continued

| Example | Treated Silica Pigment (Parts by wt.) | | | |
|---|---|---|---|---|
| | 65 | 66 | 67 | 68 |
| (E) Treated Silica Pigment[5] | | | | |
| (a) Filtered, (X) | X | X | X | X |
| (b) Dried (105°C.) (X) | X | X | X | X |

[1]Stabelite resin (a trademark product).
[2]Sunaptic acid A (a trademark product) having an acid number, mg.KOH/g. of 172).
[3]Neo Fat 225 (a trademark product).
[4]Waring blender (a trademark product).
[5]After drying micropulverized.
(a)Provides treated wet silica suitable for masterbatch and in selected combination with (b) dry silica provides composition suitable for beading.
(b)The dry treated silica is especially suitable for solution masterbatching, however, after dispersing in water such silica can be employed for latex masterbatching.

TABLE XX

| Example | Polymer-Silica Masterbatch (Parts by wt.) | | | |
|---|---|---|---|---|
| | 69 | 70 | 71 | 72 |
| (A) Polymer Solution | | | | |
| (a) Polymer | | | | |
| Butadiene-styrene[1] | 200 | — | — | — |
| Butadiene-styrene[2] | — | 200 | — | — |
| Ethylene-propylene-terpolymers[3] | — | — | 200 | — |
| Isobutylene-isoprene[4] | — | — | — | 200 |
| (b) Solvent | | | | |
| Hexane | — | — | — | 800 |
| Benzene | 1800 | 1800 | 1800 | 1800 |
| (c) Antioxidant[5] | 4 | 4 | 4 | 4 |
| (d) Solvation Conditions[4] | | | | |
| Temp. °C. | 60 | 60 | 60 | 60 |
| Time agitated, hrs. | 12 | 12 | 12 | 12 |
| (B) Silica Slurry | | | | |
| Example 65 | 1050 | — | — | — |
| Example 66 | — | 1045 | — | — |
| Example 67 | — | — | 1030 | — |
| Example 68 | — | — | — | 1016 |
| Dry solids basis | 115 | 120 | 110 | 108 |
| (C) Blending (A) and (B) | | | | |
| Blender, min. [6] | 1 | 2 | 2 | 2 |
| (D) Solvent Removal [7] | | | | |
| Boiling water (X) | X | X | X | X |
| Silica in aqueous phase | None | None | None | None |
| (E) Masterbatch | | | | |
| Dried (105°C.) (X) | X | X | X | X |

[1] SB-R 1502, a butadiene-styrene copolymer produced by emulsion polymerization.
[2] Solprene 300, (a trademark product) a normal viscosity non-staining solution polymerized random 75/25 copolymer of butadiene and styrene.
[3] Nordel 1320 (a trademark product).
[4] Butyl rubber Enjay 268 (a trademark product).
[5] Antioxidant is 2,2'-methylene-bis(4-mrthyl-6-t.-butylphenol).
[6] Waring blender (a trademark product).
[7] The treated silica solvated polymer intimate combination is dropped into boiling water to vaporize the solvent and the polymer-silica coagulum is separated from the aqueous serum and dried to yield the polymer-silica masterbatch.

TABLE XXI

Polymer-silica Masterbatch Including Processing Oil and/or Carbon Black (Parts by wt.)

| Example | | 73 | 74 | 75 | 76 |
|---|---|---|---|---|---|
| (A) | Silica Pigment Slurry | | | | |
| | Alkaline silica pigment-I (pH 8.5) | 650 | 200 | 200 | 150 |
| | Dry solids basis | 65 | 20 | 20 | 15 |
| | Water | 200 | 50 | 50 | 50 |
| (B) | Acid Reactant-Aqueous Solution | | | | |
| | 10% sulfuric acid | 22 | 6.8 | 6.8 | 5.1 |
| | Silica slurry, pH* | 7 | 7 | 7 | 7 |
| | *Filter cake after washing. | | | | |
| (C) | Oleophilic carboxylate Aqueous Solution | | | | |
| | Stearic acid | 1.0 | 0.5 | 0.5 | 0.5 |
| | 28% Aqueous ammonia | 0.4 | 0.2 | 0.2 | 0.2 |
| | Water | 30 | 15 | 15 | 15 |
| (D) | Coagulant-Aqueous Solution | | | | |
| | 2% Aluminum sulfate[1] | 55 | 27 | 27 | 27 |
| (E) | Combine (A), (B) then (C) and (D) (X) | X | X | X | X |
| | Filtered (X) | X | X | X | X |
| | Wet cake | 548 | 159 | 159 | 120 |
| (F) | Carbon Black-Processing Oil Emulsion | | | | |
| | (1) Carbon Black | | | | |
| | Carbon black[2] | — | 45 | 45 | 40 |
| | 28% Aqueous ammonia* | — | 0.5 | 0.5 | 0.5 |
| | (2) Processing Oil | | | | |
| | Processing oil[3] | 20 | 20 | 10 | — |
| | Stearic acid | — | 1 | — | — |
| | 28% Aqueous ammonia | 5 | — | — | — |
| (G) | Combine (E) and (F) | | | | |
| | Blend[6], min. | 0.5 | 0.5 | 0.5 | 0.5 |
| (H) | Polymer Solution | | | | |
| | (a) Polymer | | | | |
| | Isobutylene-isoprene[7] | 100 | — | — | — |
| | Ethylene-propylene terpolymer[8] | — | 100 | — | — |
| | Ethylene-propylene[9] | — | — | 100 | — |
| | Butadiene-styrene[10] | — | — | — | 100 |
| | (b) Solvent | | | | |
| | Hexane | 440 | 900 | — | 700 |
| | Benzene | — | — | 1300 | 200 |
| | Antioxidant[11] | 2.0 | 2.0 | 2.0 | 2.0 |
| (I) | Combine (G) and (H) | | | | |
| | Blend[6], min. | 1 | 1 | 1 | 1 |
| (J) | Solvent Removal[12] | | | | |
| | Boiling water (X) | X | X | X | X |
| | Silica remaining in aqueous serum | None | None | None | None |
| (K) | Masterbatch | | | | |
| | Dried (105°C.) (X) | X | X | X | X |

[1]Aluminum sulfate = $Al_2(SO_4)_3 \cdot 14H_2O$.
[2]Philblack O (a trademark product).
[3]Sundex 2XH (a trademark product).
[4]SBR-1502 (T.S.- 19.7%).
[5]Antioxidant 2,2'-methylene-bis(4-methylene-6-t.-butylphenol).
[6]Waring blender (a trademark product).
[7]Butyl rubber.
[8]Nordel 1320 (a trademark product).
[9]EBP-404, (a trademark product) a copolymer of ethylene and propylene.
[10]SBR-1502 a copolymer of butadiene and styrene produced by aqueous emulsion polymerization.
[11]The antioxidant is 2,2'-methylene-bis(4-methyl-6-t.-butylphenol).
*Carbon black blended with wet treated silica then ammonia added to smooth out dispersion.
[12]The treated silica with or without carbon black and/or processing oil in combination with solvated polymer is dropped into boiling water to vaporize the solvent and the silica-(black and/or oil)-polymer coagulum is separated from the aqueous serum and dried to yield the silica-elastomer masterbatch.

Table XXII, Examples 77 to 80, exemplify the treatment of wet silica pigment with reactant and then with oleophilic amine carboxylates and with carbon black and/or processing oil to form a treated wet silica pigment which when dried is a rubber dispersible pigment.

In table XXIII, Examples 81 to 83, the wet silica is treated with oleophilic amine carboxylate and blended with elastomer latex and coagulated by adding coagulant to the blend. The coagulum is separated from the serum and dried to provide the masterbatch.

In Table XXIV, Examples 84 to 87, the oleophilic amine carboxylate treated silica is blended with carbon black and/or processing oil then combined with the elastomer latex and coagulant added and the masterbatch is separated from the serum and dried.

Tables XXII, XXIII, and XXIV correspond to tables X, III, XII, respectively, of applicant's concurrently filed U.S. Pat. application and for further examples reference may be made to Examples 4 to 26, and 31 to 34 of said application herein incorporated by reference.

TABLE XXII

Silica Pigment Compositions Including Carbon Black and Processing Oil
(Parts by wt.)

| Example | | 77 | 78 | 79 | 80 |
|---|---|---|---|---|---|
| (A) | Silica Pigment Slurry | | | | |
| | Alkaline silica pigment pH = 8.5–9.5 | 25 | 25 | 25 | 25 |
| | Dry solids basis | 2.5 | 2.5 | 2.5 | 2.5 |
| | Water | 40 | 40 | 40 | 40 |
| (B) | Reagent-Aqueous Solution | | | | |
| | 2% Aluminum sulfate[1] | 8.5 | 8.5 | — | — |
| (C) | Combine (A) and (B) | | | | |
| | Blend, (X) | X | X | X | X |
| | Filter, (X) | X | X | X | X |
| (D) | Oleophilic Amine Carboxylate | | | | |
| | Tallow amine acetate[2] | 0.25 | 0.25 | — | — |
| | Coco amine acetate[3] | — | — | 0.25 | 0.20 |
| | Water | 10 | 10 | 10 | 10 |
| (E) | Combine (C) and (D) | | | | |
| | Blend[4], min. | 0.5 | 0.5 | 0.5 | 0.5 |
| (F) | Carbon Black and Processing Oil | | | | |
| | Philblack O[5] | 4 | 5 | — | — |
| | Statex 160 HR[5] | — | — | 6 | — |
| | Sundex 2XH[6] | 1 | — | — | 0.5 |
| (G) | Combine (E) and (F) | | | | |
| | Blend[4], min. | 0.5 | 0.5 | 0.5 | 0.5 |
| (H) | Treated Silica Pigment | | | | |
| | (a) Filter, (X) | X | X | X | X |
| | (b) Dried, (105°C.) (X) | X | X | X | X |

[1] Aluminum sulfate $Al_2(SO_4)_3 \cdot 14H_2O$.
[2] Armac T, a trademark product.
[3] Armac C, a trademark product.
[4] Waring blender, a trademark product.
[5] Carbon black, a trademark product.
[6] Processing oil, aa trademark product.
(a) Provides treated wet silica suitable for masterbatching and in selected combination with (b) dry silica provides composition suitable for beading.
(b) The dry treated silica is especially suitable for solution masterbatching, however, after dispersing in water such silica can be employed for latex masterbatching.

TABLE XXIII

Silica-Polymer Masterbatch
(Parts by wt.)

| Example | | 81 | 82 | 83 |
|---|---|---|---|---|
| (A) | Silica Pigment Slurry | | | |
| | Alkaline silica pigment-I (pH = 8.5–9.5) | 25 | 25 | 25 |
| | Dry solids basis | 2.5 | 2.5 | 2.5 |
| | Water | 20 | 20 | — |
| (B) | Reactant-Aqueous Solution | | | |
| | 2% Zinc sulfate | 6.5 | — | — |
| | 2% Aluminum sulfate [1] | 9.0 | — | — |
| (C) | Blend (A) and (B) | | | |
| | Blend, (X) | X | X | X |
| | Filter, (X) | X | X | X |
| (D) | Oleophilic Amine Carboxylate | | | |
| | Tallow amine oleate [2] | 0.25 | — | — |
| | Coco amine acetate [3] | — | 0.05 | 0.05 |
| | Benzene | 2 | 2 | 2 |
| | Water | 20 | 20 | 20 |
| (E) | Blend (C) and (D) | | | |
| | Blend, (X) | X | X | X |
| (F) | Polymer Latex | | | |
| | Butadiene-styrene [4] | 25.4 | 25.4 | 25.4 |
| | Dry solids basis | 5 | 5 | 5 |
| | Antioxidant [5] | 0.1 | 0.1 | 0.1 |
| | Water | 40 | 40 | 40 |
| (G) | Coagulant-Aqueous Reactant Solution | | | |
| | 2% Aluminum sulfate [1] | 10 | 10 | 16 |

TABLE XXIII—Continued

Silica-Polymer Masterbatch
(Parts by wt.)

| Example | | 81 | 82 | 83 |
|---|---|---|---|---|
| (H) | Coagulation | | | |
| | Combine (E) and (F) | | | |
| | then (G), (X) | X | X | X |
| | pH serum | 4.0 | 4.0 | 4.0 |
| | Silica in serum | None | None | None |
| (I) | Masterbatch | | | |
| | Filter and wash (X) | X | X | X |
| | Dried (105 °C.) (X) | X | X | X |

[1] Aluminum sulfate $Al_2(SO_4)_3 \cdot 14H_2O$.
[2] Armeen T oleate, a trademark product.
[3] Armac C, a trademark product.
[4] SB-R 1502 (dry solids 19.7%).
[5] The antioxidant is 2,2'-methylene-bis (4-methyl-6-t.-butylphenol).

TABLE XXIV

Silica-Polymer Masterbatch
(Parts by wt.)

| Example | | 84 | 85 | 86 | 87 |
|---|---|---|---|---|---|
| (A) | Silica Pigment Slurry | | | | |
| | Alkaline silica pigment-I (pH = 8.5–9.5) | 25 | 25 | 25 | 25 |
| | Dry solids basis | 5 | 5 | 5 | 5 |
| | Water | 20 | 20 | 20 | 20 |
| (B) | Reactant-Aqueous Solution | | | | |
| | 2% Aluminum sulfate[1] | | | | |
| | 2% Calcium chloride | | | | |
| (C) | Blend (A) and (B) | | | | |
| | Blend, (X) | X | X | X | X |
| | Filter, (X) | X | X | X | X |
| (D) | Oleophilic Amine Carboxylate | | | | |
| | 33%* Tallow amine acetate[2] | 1.1 | 1.1 | — | — |
| | 33%* Coco amine acetate[3] | — | — | 1.1 | 1.1 |
| (D) | Blend (C) and (D) | | | | |
| | Blend, (X) | X | X | X | X |
| (E) | Carbon Black | | | | |
| | Philblack O[4] | 5 | 5 | — | — |
| | Statex 160[4] | — | — | 5 | — |
| (F) | Processing Oil | | | | |
| | Sundex 2XH[4] | 0.7 | — | — | 0.5 |
| (G) | Polymer Latex | | | | |
| | Butadiene-styrene[5] | 76.2 | 76.2 | 76.2 | 25.5 |
| | Dry solids basis | 15 | 15 | 15 | 5 |
| | Antioxidant[6] | 0.3 | 0.3 | 0.3 | 0.1 |
| (H) | Combine (D), (E), (F) and (G) | | | | |
| | Blend, (X) | X | X | X | X |
| (I) | Coagulant-Aqueous Reactant Solution | | | | |
| | 2% Zinc sulfate | 60 | — | — | — |
| | 2% Calcium chloride | — | 60 | — | — |
| | 2% Magnesium chloride | — | — | 50 | — |
| | 2% Barium Chloride | — | — | — | 50 |

TABLE XXIV—Continued

Silica-Polymer Masterbatch
(Parts by wt.)

| Example | | 84 | 85 | 86 | 87 |
|---|---|---|---|---|---|
| (J) | Coagulation | | | | |
| | Combine (H) and (I) (X) | X | X | X | X |
| | pH of serum | 6.5 | 9.0 | 6.5 | 6.5 |
| | Free silica in serum | None | None | None | None |
| (K) | Masterbatch | | | | |
| | Filter and wash (X) | X | X | X | X |
| | Dried, (105°C.) (X) | X | X | X | X |

*Aqueous.
(1) Aluminum sulfate $Al_2(SO_4)_3 \cdot 14H_2O$.
(2) Armac T, a trademark product.
(3) Armac C, a trademark product.
(4) A trademark product.
(5) SB-R 1512 (dry solids 19.7%).
(6) The antioxidant is 2,2'-methylene-bis-(4-methyl-6-t.-butylphenol).

Table XXV, Examples 88 to 91, teach the treatment of wet silica pigment with reactant and with oleophilic amine carboxylate to provide a treated silica pigment which forms a masterbatch when combined with elastomer solvent solution and the solvent is removed.

Table XXVI, Example 92 to 95, exemplify the combining of carbon black and/or processing oil with oleophilic amine carboxylate treated silica pigment and elastomer solution to form a blend from which the solvent is removed yielding the masterbatch.

Tables XXV and XXVI correspond to Tables III and V, respectively, of Applicant's concurrently filed U.S. Pat. application and for further examples reference may be made to Examples 5 to 8 and 13 to 25 of said application herein incorporated by reference.

TABLE XXV

Solution Polymer-Treated Silica Masterbatch

| Example | | | (Parts by wt.) 88 | 89 | 90 | 91 |
|---|---|---|---|---|---|---|
| (A) | Preparation of Acidic, Neutrant and Alkaline Silica Pigment/Oleophilic Amine Carboxylate Composition | | | | | |
| | (a) | Silica Pigment Slurry | | | | |
| | | Alkaline silica pigment-I (pH 8.5) | 150 | 150 | 150 | 150 |
| | | Dry solids basis | 15 | 15 | 15 | 15 |
| | | Water | 50 | 50 | 50 | 50 |
| | (b) | Reagent Aqueous Solution | | | | |
| | | 2% aluminum sulfate(1) | 55 | — | — | — |
| | | 2% zinc sulfate | — | 45 | — | — |
| | | 2% sulfuric acid | — | — | 25.5 | — |
| | | Silica slurry pH | 5.0 | 6.5 | 7.0 | 8.5 |
| | (c) | Treated Silica Pigment | | | | |
| | | Filtered (X) | X | X | X | X |
| | | Filter cake | 120 | 128 | 134 | 154 |
| | (d) | Oleophilic Amine-Carboxylate Treatment and Solvent | | | | |
| | | Duomeen O-mono-oleate(2) | 0.9 | — | — | — |
| | | Duomeen T-dioleate(3) | — | 1.5 | — | — |
| | | Armeen T-oleate(4) | — | — | 1.5 | — |
| | | Armeen C-stearate(5) | — | — | — | 1.5 |
| | | Benzene | 6.7 | 8.5 | 12 | 10.5 |
| | (e) | Blending (c) and (d) | | | | |
| | | Blender(6), min. | 0.5 | 0.5 | 0.5 | 0.5 |
| (B) | Polymer Solution | | | | | |
| | (a) | Polymer | | | | |
| | | Isobutylene-isoprene(7) | 30 | 30 | — | — |
| | | Ethylene-propylene terpolymer(8) | — | — | 30 | 30 |
| | (b) | Solvent | | | | |
| | | Benzene | — | — | 270 | 270 |
| | | Hexane | 132 | 132 | — | — |
| | | Antioxidant(9) | 0.6 | 0.6 | 0.6 | 0.6 |
| | (c) | Solvation Conditions | | | | |
| | | Temp. °C. | 60 | 60 | 60 | 60 |
| | | Time agitated, hrs. | 12 | 12 | 12 | 12 |
| (C) | Blending (A) plus (B) | | | | | |
| | | Blender(6), min. | 0.5 | 0.5 | 0.5 | 0.5 |

TABLE XXV—Continued

Solution Polymer-Treated Silica Masterbatch

| Example | | | (Parts by wt.) 88 | 89 | 90 | 91 |
|---|---|---|---|---|---|---|
| (D) | Solvent Removal[10] | | | | | |
| | Boiling water (X) | | X | X | X | X |
| | Silica separation into water phase | | None | None | None | None |
| (E) | Masterbatch | | | | | |
| | Dried (105°C.) (X) | | X | X | X | X |

[1] Aluminum sulfate Al₂(SO₄)₃·14H₂O.
[2] duomeen O-oleate, a trademark product, N-ikeuc trimethylene diamine monooleate.
[3] Duomeen T DO, a trademark product, N-tallow trimethylene diamine dioleate.
[4] Armeen TO, a trademark product, tallow-amine oleate.
[5] Armeen CT, a trademark product, coco amine stearate.
[6] Waring blender, a trademark product.
[7] Butyl rubber (a trademark product).
[8] Nordel 1320 (a trademark product) a terpolymer of ethylene, propylene and a non-conjugated diene.
[9] The antioxidant is 2,2'-methylene-bis(4-methyl-6-t.-butylphenol).
[10] The treated silica-solvated polymer masterbatch is dropped into boiling water to vaporize the solvent and the silica-polymer masterbatch is recovered and dried.
NOTE: In any of Examples 1–4, steps (A)(d) and (A)(e) may be practiced without the use of organic solvent by dissolving the amine component of the salt in water with the aid of mineral acid, adding same to the wet silica pigment in step (A)(e) and then adding the fatty acid component as an alkali metal or ammonium salt in aqueous solution; the resulting oleophilic amine carboxylate depositing on the silica pigment.

TABLE XXVI

Solution Polymer-Treated Silica Masterbatch

| Example | | | (Parts by wt.) 92 | 93 | 94 | 95 |
|---|---|---|---|---|---|---|
| (A) | Silica Pigment-Treated | | | | | |
| | (a) | Silica Pigment Slurry | | | | |
| | | Alkaline silica pigment-I (pH 9.5) | 150 | 150 | 150 | 150 |
| | | Dry solids basis | 15 | 15 | 15 | 15 |
| | | Water | 50 | — | 50 | — |
| | (b) | Reagent-Aqueous Solution | | | | |
| | | 2% aluminum sulfate[1] | 55 | — | 55 | — |
| | | Silica slurry pH | 5.0 | 9.5 | 5.0 | 9.5 |
| | (c) | Silica Pigment | | | | |
| | | Filtered (X) | X | X | X | X |
| | | Filter cake | 121 | 120 | 120 | 12 |
| | (d) | Oleophilic Amine Carboxylate Solution | | | | |
| | | Armac C[2] | 0.3 | 0.7 | — | — |
| | | Duomac O[3] | — | — | 1.2 | — |
| | | Duomac T[4] | — | — | — | 1.8 |
| | | Benzene | — | — | 3.6 | — |
| | | Water | 0.6 | 7.3 | — | 7.2 |
| | (e) | Blend (c) and (d), min. | 0.5 | 0.5 | 0.5 | 0.5 |
| (B) | Polymer Solution | | | | | |
| | (a) | Polymer | | | | |
| | | Isobutylene-isoprene[5] | 30 | 30 | 30 | — |
| | | Butadiene-styrene[6] | — | — | — | — |
| | | Ethylene-propylene terpolymer[7] | — | — | — | 30 |
| | (b) | Solvent | | | | |
| | | Hexane | 132 | 132 | 132 | — |
| | | Benzene | — | — | — | 270 |
| | | Antioxidant[8] | 0.6 | 0.6 | 0.6 | 0.6 |
| | (c) | Solvation Conditions | | | | |
| | | Temp. °C. | 60 | 60 | 60 | 60 |
| | | Time agitated, hrs. | 12 | 12 | 12 | 12 |
| (C) | Blending (A) plus (B) | | | | | |
| | Blender[9], min. | | 0.5 | 0.5 | 0.5 | 0.5 |
| (D) | Solvent Removal[10] | | | | | |
| | Boiling water (X) | | X | X | X | X |
| | Silica separation into water phase | | None | None | None | None |
| (E) | Masterbatch | | | | | |
| | Dried (105°C.) (X) | | X | X | X | X |

[1] Aluminum sulfate Al₂(SO₄)₃·14H₂O.
[2] Armac C, a trademark product, coco amine acetate.
[3] Duomac O, a trademark product, oleic 1,3-propylene diamine diacetate.
[4] Duomac T, a trademark product, N-tallow trimethylene diamine diacetate.
[5] Butyl rubber, a trademark product.
[6] Solprene 300, (a trademark product) a normal viscosity, non-staining, solution polymerized random 75/25 copolymer of butadiene and styrene.
[7] Nordel 1320, (a trademark product) a terpolymer of ethylene, propylene and a non-conjugated diene.
[8] The antioxidant is 2,2'-methylene-bis(4-methyl-6-t.-butylphenol).
[9] Waring blender, a trademark product.
[10] The silica-solvated polymer masterbatch is dropped into boiling water to vaporize the solvent and the polymer-silica masterbatch is recovered and dried.

Table XXVII, Examples 96 to 98, exemplify the treatment of wet hydrated silica pigment with oleophilic hydroxyl compounds and the masterbatching with elastomer latex.

Table XXVIII, Examples 99 to 102, teach the latex materbatching of elastomers and wet silica pigment treated with oleophilic hydroxyl material and combined with carbon black and/or processing oil.

Table XXIX, Examples 103 to 106, teach the solution masterbatching of elastomers with wet silica which has been made oleophilic with the aid of oleophilic hydroxyl compounds.

Table XXX, Examples 107 to 110, further teach the masterbatching of solutions of polymers with the oleophilic hydroxyl compound treated silica and carbon black and/or processing oil.

TABLE XXVII

Silica-Polymer Masterbatch
(Parts by wt.)

| Example | | 96 | 97 | 98 |
|---|---|---|---|---|
| (A) | Silica Pigment Slurry | | | |
| | Alkaline silica pigment-I (pH 8.5–9.5) | 150 | 150 | 150 |
| | Dry solids basis | 15 | 15 | 15 |
| | Water | 50 | 50 | 50 |
| (B) | Reagent-Aqueous Solution | | | |
| | 2% Aluminum sulfate[1] | 55 | — | — |
| | 2% Calcium chloride | — | 30 | — |
| | 2% Sulfuric acid | — | — | 26 |
| (C) | Blend (A) and (B) | | | |
| | Blend, (X) | X | X | X |
| | Serum pH | 5.6 | 6.5 | 4.0 |
| (D) | Oleophilic Hydroxyl Compound | | | |
| | Octadecanol | 2.5 | — | — |
| | Dodecanol | — | 1.5 | — |
| | Octanol | — | — | 0.8 |
| | Benzene | 10 | 5 | 15 |
| (E) | Combine (C) and (D) | | | |
| | Heat (C), °C. | 80 | 80 | 80 |
| | Blend in (D), (X) | X | X | X |
| | Cool, (X) | X | X | X |
| (F) | Polymer Latex | | | |
| | Butadiene-styrene[2] | 153 | 153 | 153 |
| | Dry solids basis | 30 | 30 | 30 |
| | Antioxidant[3] | 0.6 | 0.6 | 0.6 |
| | Water | 150 | 150 | 150 |
| (G) | Coagulant-Aqueous Solution | | | |
| | 2% Aluminum sulfate[1] | 85 | — | — |
| | 2% Calcium chloride | — | 80 | — |
| | 2% Sulfuric acid | — | — | 40 |
| | Water | 500 | 500 | 500 |
| (H) | Coagulation[4] | | | |
| | Added treated silica + polymer latex to coagulant (X) | X | X | X |
| | pH serum | 4.5 | 6.4 | 3.5 |
| | Silica in serum | None | None | None |
| (I) | Masterbatch | | | |
| | Filtered and washed (X) | X | X | X |
| | Dried (105°C.) (X) | X | X | X |

[1]Aluminum sulfate $Al_2(SO_4)_3 \cdot 14H_2O$.
[2]SBR-1502 latex (T.S. = 19.7%) stabilized with about 5% emulsifier.
[3]Antioxidant is 2,2'-methylene-bis(4-methyl-6-t.-butylphenol).
[4]In the examples the polymer latex and silica treated with oleophilic hydroxyl material were combined and run into the coagulant solution, with stirring.

TABLE XXVIII

Silica-Polymer Masterbatch with
Carbon Black and/or Processing Oil
(Parts by wt.)

| Example | | 99 | 100 | 101 | 102 |
|---|---|---|---|---|---|
| (A) | Silica Pigment Slurry | | | | |
| | Alkaline silica pigment-I (pH 8.5–9.5) | 25 | 25 | 25 | 25 |
| | Dry basis | 2.5 | 2.5 | 2.5 | 2.5 |
| (B) | Reagent Aqueous Solution | | | | |
| | 2% Sulfuric acid | 4.5 | 4.5 | 4.5 | 4.5 |
| (C) | Oleophilic Quaternary Hydroxyl Compound | | | | |
| | 10% Dodecanol* | 1.0 | 1.0 | — | — |
| | 10% Octadecanol* | — | — | 1.5 | 1.5 |

TABLE XXVIII — Continued

Silica-Polymer Masterbatch with
Carbon Black and/or Processing Oil
(Parts by wt.)

| Example | | 99 | 100 | 101 | 102 |
|---|---|---|---|---|---|
| (D) | Combine (A) and (B) then (C) Blend[1], min. | 0.5 | 0.5 | 0.5 | 0.5 |
| (E) | Carbon Black and Processing Oil | | | | |
| | Statex 160HR[2] | 5.0 | 5.0 | 7.5 | 7.5 |
| | Sundex 2XH[3] | — | — | 1.0 | 1.0 |
| (F) | Combine (D) and (E) Blend[3], min. | 0.5 | 0.5 | 0.5 | 0.5 |
| (G) | Polymer Latex | | | | |
| | Butadiene-styrene[4] | 78 | 78 | 103 | 103 |
| | Dry basis | 15 | 15 | 20 | 20 |
| | Antioxidant[5] | 0.3 | 0.3 | 0.3 | 0.3 |
| (H) | Combine (F) and (G) Blender[1], min. | 1 | 1 | 1 | 1 |
| (I) | Coagulant-Aqueous Solution | | | | |
| | 2% Calcium chloride | 14 | — | — | — |
| | 2% Barium chloride | — | 32 | — | — |
| | 2% Aluminum sulfate[6] | — | — | 28 | — |
| | 2% Sulfuric acid | — | — | — | 12 |
| (J) | Combine (H) and (I) | | | | |
| | Mix, (X) | X | X | X | X |
| | Serum pH | 6.4 | 6.4 | 5.0 | 4.0 |
| | Silica and/or black in serum | None | None | None | None |
| (K) | Masterbatch | | | | |
| | Filter and wash (X) | X | X | X | X |
| | Dried (105°C.) (X) | X | X | X | X |

*In benzene.
[1]Waring blender, a trademark product.
[2]Carbon black, a trademark product.
[3]Processing oil, a trademark product.
[4]SBR-1502 latex (TS = 18.4%).
[5]Antioxidant is 2,2'-methylene-bis(4-methyl-6-t.-butylphenol).
[6]Aluminum sulfate $Al_2(SO_4)_3 \cdot 14H_2O$.

TABLE XXIX

Silica-Polymer Masterbatch
(Parts by wt.)

| Example | | 103 | 104 | 105 | 106 |
|---|---|---|---|---|---|
| (A) | Silica Pigment Slurry | | | | |
| | Alkaline silica pigment-I (pH = 8.5–9.5) | 150 | 150 | 150 | 150 |
| | Dry solids basis | 15 | 15 | 15 | 15 |
| | Water | 50 | 50 | 50 | 50 |
| (B) | Reactant Aqueous Solution | | | | |
| | 2% Aluminum sulfate[1] | 55 | — | — | — |
| | 2% Zinc sulfate | — | 45 | — | — |
| | 2% Sulfuric acid | — | — | 31 | — |
| (C) | Combine (A) and (B) | | | | |
| | Blend, (X) | X | X | X | X |
| | Serum pH | 5.0 | 6.5 | 4.0 | 8.5 |
| (D) | Oleophilic Hydroxyl Compound | | | | |
| | 20% Octanol* | 5.0 | — | — | — |
| | 20% Dodecanol* | — | 10 | — | — |
| | 20% Sterol* | — | — | 2.5 | 7.5 |
| (E) | Combine (C) and (D) Blend, (X) | X | X | X | X |
| (F) | Polymer Solution | | | | |
| (a) | Polymer | | | | |
| | Isobutylene-isoprene[2] | 30 | — | — | — |
| | Butadiene-styrene[3] | — | 30 | — | — |
| | Ethylene-propylene terpolymer[4] | — | — | 30 | 30 |
| (b) | Solvent | | | | |
| | Hexane | 132 | 270 | 270 | 270 |
| | Antioxidant[5] | 0.6 | 0.6 | 0.6 | 0.6 |
| (c) | Solvation Conditions | | | | |
| | Temperature °C. | 60 | 60 | 60 | 60 |
| | Time agitated, hrs. | 12 | 12 | 12 | 12 |

TABLE XXIX—Continued

Silica-Polymer Masterbatch
(Parts by wt.)

| Example | | 103 | 104 | 105 | 106 |
|---|---|---|---|---|---|
| (G) | Blending (A) plus (B) Blender[6], min. | 0.5 | 0.5 | 0.5 | 0.5 |
| (H) | Solvent Removal[7] Boiling water (X) | X | X | X | X |
| | Silica separation into water phase | None | None | None | None |
| (I) | Masterbatch Dried (105°C.) (X) | X | X | X | X |

*In hexane.
[1]Aluminum sulfate $Al_2(SO_4)_3 \cdot 14H_2O$.
[2]Butyl rubber, a trademark product.
[3]Solprene 300, (a trademark product) a normal viscosity, non-staining, solution polymerized random 75/25 copolymer of butadiene and styrene.
[4]Nordel 1320, (a trademark product) a terpolymer of ethylene, propylene and a non-conjugated diene.
[5]The antioxidant is 2,2'-methylene-bis(4-methyl-t-t.-butylphenol).
[6]Waring blender, a trademark product.
[7]The treated silica-solvated polymer masterbatch is dropped into boiling water to vaporize the solvent and the polymer-silica blend is separated from the serum and dried to yield the masterbatch.

TABLE XXX

Silica-Polymer Masterbatch with
Processing Oil and/or Carbon Black
(Parts by wt.)

| Example | | 107 | 108 | 109 | 110 |
|---|---|---|---|---|---|
| (A) | Silica Pigment Slurry Alkaline silica pigment-I (pH = 8.5–9.5) | 200 | 200 | 200 | 200 |
| | Dry solids basis | 20 | 20 | 20 | 15 |
| | Water | 50 | 30 | 50 | 50 |
| (B) | Reactant-Aqueous Solution 10% Sulfuric acid | 6.8 | 6.8 | 6.8 | 5.1 |
| | Silica slurry, pH* | 6.5 | 6.5 | 6.5 | 6.5 |
| (C) | Treated Silica Pigment Filtered (X) | X | X | X | X |
| | Filter cake | 160 | 160 | 160 | 120 |
| (D) | Oleophilic Hydroxyl Compound Ricinoleol | 1.0 | — | — | — |
| | Octadecanol | — | 1.5 | — | — |
| | Dodecanol | — | — | 2.0 | 2.5 |
| (E) | Combine (C) and (D) Combine by Heating, (X) | X | X | X | X |
| | Mixing (X) | X | X | X | X |
| (F) | Processing Oil, etc. Sundex 2XH[1] | 10 | 5 | 5 | — |
| | Benzene | — | 40 | 40 | — |
| | 28% Aqueous Ammonia | 1.6 | — | — | — |
| (G) | Combine (E) and (F) Blend, (X) | X | X | X | X |
| (H) | Carbon Black Statex 160[2] | — | 45 | 45 | 40 |
| (I) | Combine (G) and (H) and mix (X) | — | X | X | X |
| (J) | Polymer Solution (a) Copolymer Butadiene-styrene[3]= | 35 | — | — | — |
| | Butadiene-styrene[4]= | — | 100 | — | — |
| | Isobutylene-isoprene[5] | — | — | 100 | — |
| | Ethylene-propylene terpolymer[6] | — | — | — | 100 |
| | (b) Solvent Hexane | 200 | 400 | 440 | 900 |
| | Antioxidant[7] | 0.75 | 2 | 2 | 2 |
| | (c) Solvation Conditions Temp., °C. | 70 | 70 | 70 | 70 |
| | Time agitated, hrs. | 12 | 12 | 12 | 12 |
| (K) | Blending (I) and (J) Blender[8], min. | 0.5 | 0.5 | 0.5 | 0.5 |

TABLE XXX—Continued

Silica-Polymer Masterbatch with
Processing Oil and/or Carbon Black
(Parts by wt.)

| Example | | 107 | 108 | 109 | 110 |
|---|---|---|---|---|---|
| (L) | Solvent Removal[9] | | | | |
| | Boiling water (X) | X | X | X | X |
| | Silica separation into water phase | None | None | None | None |
| (M) | Masterbatch | | | | |
| | Dried (105°C.) (X) | X | X | X | X |

[1] Processing oil, a trademark product.
[2] Carbon black, a trademark product.
[3] Solprene 300, (a trademark product) a normal viscosity, non-staining solution polymerized random 75/25 copolymer of butadiene and styrene.
[4] Solprene 1206, (a trademark product) same as [1] except of low viscosity.
[5] Butyl rubber 268, a trademark product.
[6] Nordel 1320, (a trademark product) a terpolymer of ethyl ethylene-propylene and a non-conjugated diene.
[7] The antioxidant is 2,2'-methylene-bis(4-methyl-6-t.-butylphenol).
[8] Waring blender, a trademark product.
[9] The pigment solvated polymer masterbatch is dropped into boiling water to vaporize the solvent and the polymer-pigment masterbatch is recovered and dried.
* Milled.

Table XXXI, Examples 111 to 113, teaches that acid treated silica is readily beaded with processing oil and water. It took about 120–130 parts of water per 100 parts by weight of silica plus oil to obtain the desired consistency for beading.

Table XXXII, Examples 110 to 117 shows that aqueous aluminum salt and alkaline earth treated silica can be beaded with the aid of processing oil.

Tables XXXIII and XXXIV, Examples 118 to 126, exemplify that silica, carbon black and processing oil can be beaded with the aid of water.

Table XXXV, Examples 127–129, teaches the effects of various ratios of silica to carbon black on the quantity of beading water required.

Table XXXVI teaches that beads can be prepared from wet silica-carbon black combinations without extra water for beading being added and when the chosen wet silica is alkaline or acid or has been treated with aluminum, zinc or the alkaline earth water soluble salts.

Table XXXVII, Examples 131 to 134, exemplify wet silica and combinations of wet silica and dry silica with or without water and carbon black forming beads.

Table XXXVIII, Examples 135 to 140, teach silica treated with oleophilic materials, categories I to VI and combinations VII (see (B) in FIG. 1 and FIG. 2) hereof) can form beads with and without carbon black and/or processing oil. In preparing similar examples to those set forth in Table XXXVIII any of the silicas employed in Examples 1 to 110 providing the moisture content of the oleophilic silica is adjusted to the amount needed for beading which is about 110 to 140 parts based on 100 parts of silica dry weight and if carbon black and/or processing oil is present the beading water may increase a small amount to the range 110 to 160 dry solids by weight.

Table XXXIX, Examples 141 to 144, exemplify the use of water soluble polyol material in the preparation of silica beads with or without carbon black and/or processing oil. In place of the ethylene glycol in Example 141 hereof one can employ a similar quantity of Polyethylene Glycol 4000 (TM).

Where the term pigment "bead" is used herein such term is synonymous with the term "pellet", as used in the rubber industry.

TABLE XXXI

Processing Oil vs Water in
Beading of Silica Treated with Acid
(Parts by wt.)

| Example | | 111 | 112 | 113 |
|---|---|---|---|---|
| (A) | Silica Pigment Slurry | | | |
| | Alkaline silica pigment-I | | | |
| | (pH = 8.5–9.5) | 250 | 250 | 250 |
| | Dry solids basis | 25 | 25 | 25 |
| | Water | 200 | 200 | 200 |
| (B) | Reactant-Aqueous Solution | | | |
| | 2% Sulfuric acid | 45 | 45 | 45 |
| (C) | Treated Silica Pigment | | | |
| | Blend (A) and (B), (X) | X | X | X |
| | (1) Filter and wash, (X) | X | X | X |
| | (2) Dry, (105°C.), (X) | X | X | X |
| | (3) Micropulverize | X | X | X |
| (D) | Pigment w/wo Processing Oil and Water | | | |
| | Silica (C) (3) dry | 25 | 25 | 25 |
| | Water | 33 | 34.5 | 35 |
| (E) | Preparation of Emulsion | | | |
| | Circosol 2XH[1] | 5 | 2.5 | 1.25 |
| | Water | 5 | 2.5 | 1.25 |
| | Sunaptic acid B[2] | 0.1 | 0.05 | 0.02 |
| | 28% Aqueous Ammonia | 0.1 | 0.05 | 0.02 |
| | Emulsify, (X) | X | X | X |

TABLE XXXI—Continued

Processing Oil vs Water in
Beading of Silica Treated with Acid
(Parts by wt.)

| Example | | 111 | 112 | 113 |
|---|---|---|---|---|
| (F) | Beading Blend (D) and (E)) | | | |
| | Blend, min. | 1 | 1 | 1 |
| | Laboratory beader, min. | 3 | 3 | 3 |
| | Beaded (X) | X | X | X |
| | Beads dried (105°C.) (X) | X | X | X |
| (G) | Bead Composition Prior to Drying | | | |
| | Silica[3] | 100 | 100 | 100 |
| | Processing oil | 20 | 10 | 5 |
| | Water | 152 | 148 | 145 |

[1]Processing oil, a trademark product.
[2]Naphthenic acids, a trademark product.
[3]Silica treated with acid.

TABLE XXXII

Processing Oil vs. Water in
Beading of Silica Treated With
Aluminum and Calcium Salts
(Parts by wt.)

| Example | | 114 | 115 | 116 | 117 |
|---|---|---|---|---|---|
| (A) | Silica Pigment Slurry | | | | |
| | Alkaline silica pigment-1 (pH = 8.5–9.5) | 250 | 250 | 250 | 250 |
| | Dry solids basis | 25 | 25 | 25 | 25 |
| | Water | 300 | 300 | 300 | 300 |
| (B) | Reactant-Aqueous Solution | | | | |
| | 2% Calcium chloride | 50 | 50 | — | — |
| | 2% Aluminum sulfate[1] | — | — | 85 | 85 |
| (C) | Treated Silica Pigment | | | | |
| | Blend (A) and (B), (X) | X | X | X | X |
| | (1) Filter and wash, (X) | X | X | X | X |
| | (2) Dry (105°C.), (X) | X | X | X | X |
| | (3) Micropulverize, (X) | X | X | X | X |
| (D) | Pigment w/wo Processing Oil and Water | | | | |
| | Silica (C)(3), dry | 25 | 25 | 25 | 25 |
| | Water | 27 | 34 | 35 | 29 |
| (E) | Preparation Oil Emulsion | | | | |
| | Sundex 53[2] | 2.5 | — | 2.5 | — |
| | Dutrex 20[2] | — | 5 | — | 5 |
| | Water | 2.5 | 5 | 2.5 | 5 |
| | Synaptic acid B[3] | 0.05 | 0.10 | 0.05 | — |
| | Tallow fatty acids | — | — | — | 0.10 |
| | 28% Ammonia | 0.05 | 0.10 | 0.05 | 0.10 |
| | Emulsify, (X) | X | X | X | X |
| (F) | Beading (Blend (D) and (E)) | | | | |
| | Blend, min. | 1 | 1 | 1 | 1 |
| | Laboratory beader, min. | 3 | 3 | 3 | 3 |
| | Beaded, (X) | X | X | X | X |
| | Beads, dried (105°C.) (X) | X | X | X | X |
| (G) | Bead Composition Prior to Drying | | | | |
| | Silica | 100[4] | 100[4] | 100[5] | 100[5] |
| | Processing oil | 10 | 20 | 10 | 20 |
| | Water | 126 | 128 | 146 | 160 |

[1]Aluminum sulfate Al$_2$(SO$_4$)$_3$·14H$_2$O.
[2]Processing oil, a trademark product.
[3]Naphthenic acids, a trademark product.
[4]Silica treated with aluminum salt.
[5]Silica treated with calcium salts.

TABLE XXXIII

Processing Oil vs. Water in
Beading of Silica and Carbon Black
Silica Treated with Aluminum Salts
(Parts by wt.)

| Example | | 118 | 119 | 120 | 121 |
|---|---|---|---|---|---|
| (A) | Silica Pigment Slurry | | | | |
| | Alkaline silica pigment-I | | | | |
| | (pH = 8.5–9.5) | 250 | 250 | 250 | 250 |
| | Dry solids basis | 25 | 25 | 25 | 25 |
| | Water | 300 | 300 | 300 | 300 |
| (B) | Reactant-Aqueous Solution | | | | |
| | 2% Aluminum sulfate[1] | 90 | 90 | 90 | 90 |
| (C) | Treated Silica Pigment | | | | |
| | Blend (A) and (B),(X) | X | X | X | X |
| | (1) Filter and wash,(X) | X | X | X | X |
| | (2) Dry, (105°C.), (X) | X | X | X | X |
| | (3) Micropulverize (X) | X | X | X | X |
| (D) | Pigment w/wo Processing | | | | |
| | Oil and Water | | | | |
| | Silica (C)(3), dry | 7.5 | 3.6 | 7.5 | 7.5 |
| | Silica (C)(1) wet | — | 38.8 | — | 38.8 |
| | dry solids basis | — | 3.9 | — | 3.9 |
| | water | — | 34.9 | — | 34.9 |
| | Statex 160[2] | 22.5 | 22.5 | 22.5 | 22.5 |
| | Water | 34 | — | 35 | — |
| (E) | Preparation Oil Emulsion | | | | |
| | Circosol 2X4[3] | 3 | 3 | 6 | 6 |
| | Water | 3 | 3 | 6 | 6 |
| | Sunaptic acid B[4] | 0.06 | 0.06 | 0.12 | 0.12 |
| | 28% Aqueous Ammonia | 0.06 | 0.06 | 0.12 | 0.12 |
| | Emulsify | X | X | X | X |
| | Blend, (X) | X | X | X | X |
| (F) | Beading (Blend (D) and (E)) | | | | |
| | Blender[5], min. | 1 | 1 | 1 | 1 |
| | Laboratory Beader[6] min. | 33 | 3 | 3 | 3 |
| | Beaded, (X) | X | X | X | X |
| (G) | Bead Composition | | | | |
| | Prior to Drying | | | | |
| | Silica[7] | 25 | 25 | 25 | 25 |
| | Carbon black | 75 | 75 | 75 | 75 |
| | Total pigment | 100 | 100 | 100 | 100 |
| | Processing oil | 10 | 10 | 20 | 20 |
| | Water | 116 | 119 | 133 | 128 |

[1] Aluminum sulfate $AL_2(SO_4)_3 \cdot 14H_2O$.
[2] Carbon black, a trademark product.
[3] Naphthenic acids, a trademark product.
[4] Waring blender, a trademark product.
[5] Egg beater.
[6] Silica treated with aluminum salts.

TABLE XXXIV

Processing Oil vs. Water in
Beading of Silica and Carbon Black
Silica Treated with Calcium Salts
(Parts by wt.)

| Example | | 122 | 123 | 124 | 125 | 126 |
|---|---|---|---|---|---|---|
| (A) | Silica Pigment Slurry | | | | | |
| | Alkaline silica pigment-I | | | | | |
| | (pH = 8.5–9.5) | 250 | 250 | 250 | 250 | 250 |
| | Dry solids basis | 25 | 25 | 25 | 25 | 25 |
| | Water | | | 300 | 300 | 300 | 300 |
| (B) | Reactant-Aqueous Solution | | | | | |
| | 2% Calcium chloride | 50 | 50 | 50 | 50 | 50 |
| (C) | Treated Silica Pigment | | | | | |
| | Blend (A) and (B), (X) | X | X | X | X | X |
| | (1) Filter and wash, (X) | X | X | X | X | X |
| | (2) Dry, (105°C.),(X) | X | X | X | X | X |
| | (3) Micropulverize, (X) | X | X | X | X | X |

TABLE XXXIV — Continued

Processing Oil vs. Water in
Beading of Silica and Carbon Black
Silica Treated with Calcium Salts
(Parts by wt.)

| Example | | 122 | 123 | 124 | 125 | 126 |
|---|---|---|---|---|---|---|
| (D) | Pigment w/wo Processing Oil plus water | | | | | |
| | Silica (C)(3) dry | 7.5 | 3.6 | 7.5 | 3.6 | 7.5 |
| | Silica (C)(1) wet | — | 38.8 | — | 38.8 | — |
| | Dry solids basis | — | 3.9 | — | 3.9 | — |
| | Water | — | 34.9 | — | 34.9 | — |
| | Statex 160 | 22.5 | 22.5 | 22.5 | 22.5 | 22.5 |
| | Water | 35 | — | 35 | — | 43.5 |
| (E) | Preparation of Emulsifier | | | | | |
| | Circosol 2XH[(1)] | 3 | 3 | 6 | 6 | 12 |
| | Water | 3 | 3 | 6 | 6 | 12 |
| | Sunaptic acid[(2)] | 0.06 | 0.06 | 0.12 | 0.12 | 0.24 |
| | 28% Aqueous Ammonia | 0.06 | 0.06 | 0.12 | 0.12 | 0.24 |
| | Emulsify (X) | X | X | X | X | X |
| (F) | Beading (Blend (D) and (E)) | | | | | |
| | Blend, min. | 1 | 1 | 1 | 1 | 1 |
| | Laboratory beader, min. | 3 | 3 | 3 | 3 | 3 |
| | Beaded, (X) | X | X | X | X | X |
| | Beads dried, (105°C.),(X) | X | X | X | X | X |
| (G) | Bead Composition Prior to Drying | | | | | |
| | Silica[(3)] | 25 | 25 | 25 | 25 | 25 |
| | Carbon black | 75 | 75 | 75 | 75 | 75 |
| | Total pigment | 100 | 100 | 100 | 100 | 100 |
| | Processing oil | 10 | 10 | 20 | 20 | 40 |
| | Water | 119 | 118 | 132 | 128 | 145 |

[(1)]Processing oil, a trademark product.
[(2)]Naphthenic acid, a trademark product.
[(3)]Silica treated with calcium salt.

TABLE XXXV

Silica-Carbon Black
Ratio vs. Beading Water
(Parts by wt.)

| Example | | 127 | 128 | 129 |
|---|---|---|---|---|
| (A) | Silica Pigment Slurry | | | |
| | Alkaline silica pigment-I (pH = 8.5–9.5) | 500 | 500 | 500 |
| | Dry solids basis | 50 | 50 | 50 |
| | Water | 550 | 550 | 550 |
| (B) | Reactant-Aqueous Solution | | | |
| | 2% Sulfuric acid | 90 | 90 | 90 |
| (C) | Treated Silica Pigment | | | |
| | Blend (A) and (B), (X) | X | X | X |
| | (1) Filter and wash, (X) | X | X | X |
| | (2) Dry, (105°C.), (X) | X | X | X |
| | (3) Micropulverize | X | X | X |
| (D) | Pigment and Water | | | |
| | Silica (C)(3) dry | 33.7 | 30 | 25 |
| | Statex 160[(1)] | 22.5 | 10 | 5 |
| | Water | 68 | 53 | 48 |
| (E) | Beading (Blend (C) and (D)) | | | |
| | Blend, min. | 1 | 1 | 1 |
| | Laboratory beader, min. | 3 | 3 | 3 |
| | Beaded, (X) | X | X | X |
| | Beads dried (105°C.) (X) | X | X | X |
| (F) | Bead Composition Prior to Drying | | | |
| | Silica[(2)] | 60 | 75 | 83 |
| | Carbon black | 40 | 25 | 17 |
| | Total pigment | 100 | 100 | 100 |
| | Water | 120 | 132 | 160 |

[(1)]Carbon black, a tradenmark product.
[(2)]Acid treated silica.

TABLE XXXVI

Silica-Carbon Black Beads
Silica Treatment vs. Beading Water
(Parts by wt.)

| Example | | 127 | 128 | 129 | 130 |
|---|---|---|---|---|---|
| (A) | Silica Pigment Slurry | | | | |
| | Alkaline silica pigment-I | | | | |
| | (pH = 8.5–9.5) | 250 | 250 | 250 | 250 |
| | Dry solids basis | 25 | 25 | 25 | 25 |
| | Water | 200 | 200 | 200 | 200 |
| (B) | Reactant-Aqueous Solution | | | | |
| | 2% Sulfuric acid | — | 45 | — | — |
| | 2% Aluminum sulfate | — | — | 85 | — |
| | 2% Calcium chloride | — | — | — | 50 |
| (C) | Treated Silica Pigment | | | | |
| | Blend (A) and (B), (X) | X | X | X | X |
| | (1) Filter and wash,(X) | X | X | X | X |
| (D) | Pigment w/wo Processing | | | | |
| | Oil plus Water | | | | |
| | Silica (C)(1) wet | 43.6 | 38.8 | 40.8 | 40.6 |
| | Dry solids, basis | 7.5 | 7.6 | 7.6 | 7.5 |
| | Water content | 36.1 | 31.3 | 33.3 | 33.0 |
| | State 125 | 22.5 | 22.5 | 22.5 | 22.5 |
| | Water | — | — | — | — |
| | Blend, (X) | X | X | X | X |
| (E) | Beading | | | | |
| | Blend, min. | 1 | 1 | 1 | 1 |
| | Laboratory beader, min. | 3 | 3 | 3 | 3 |
| | Beaded, (X) | X | X | X | X |
| | Beads dried (105°C.) (X) | X | X | X | X |
| (F) | Bead Composition Prior to Drying | | | | |
| | Silica-treatment | alk. | acid | alum. | calcium |
| | Silica | 25 | 25 | 25 | 25 |
| | Carbon black | 75 | 75 | 75 | 75 |
| | Total pigment | 100 | 100 | 100 | 100 |
| | Water | 120 | 104 | 111 | 110 |

TABLE XXXVII

Wet Silica-Carbon Black Beading
(Parts by wt.)

| Example | | 131 | 132 | 133 | 134 |
|---|---|---|---|---|---|
| (A) | Silica Pigment Slurry | | | | |
| | Alkaline silica pigment-I | | | | |
| | (pH = 8.5–9.5) | 250 | 250 | 250 | 250 |
| | Dry solids basis | 25 | 25 | 25 | 25 |
| | Water | 200 | 200 | 200 | 200 |
| (B) | Reactant-Aqueous Solution | | | | |
| | 2% Sulfuric acid | 45 | 45 | 45 | 45 |
| (C) | Treated Silica Pigment | | | | |
| | Blend (A) and (B), (X) | X | X | X | X |
| | (1) Filter and wash,(X) | X | X | X | X |
| | (2) Dry (105°C.), (X) | X | X | X | X |
| | (3) Micropulverize | X | X | X | X |
| (D) | Pigment w/wo Processing | | | | |
| | Oil Plus Water | | | | |
| | Silica (C)(3) dry | — | 1.6 | 3.6 | 5.5 |
| | Silica (C)(1) wet | 38.8 | 39.7 | 38.8 | 20.0 |
| | Solids, % | 19.3[1] | 14.8[1] | 10.0 | 10.0 |
| | Dry solids basis | 7.5 | 5.9 | 3.9 | 2.0 |
| | Water content | 31.3 | 33.8 | 34.9 | 18.0 |
| | Statex 125[2] | 22.5 | 22.5 | 22.5 | 22.5 |
| | Water | — | — | — | 14.0 |
| | Blend, (X) | X | X | X | X |

[1] Silica filter cake having 10% solids was pressed to 14.8% solids and 19.3% solids, respectively.
[2] Carbon black, a trademark product.

TABLE XXXVIII

Beading of Silica-Treated with Oleophilic Material
(Parts by wt.)

| Example | | 135 | 136 | 137 | 138 | 139 | 140 |
|---|---|---|---|---|---|---|---|
| (A) | Pigment and Beading Water | | | | | | |
| | (1) Silica-Oleophilic Treatment (dry) | | | | | | |
| | I. Amine Silica, Example 4 | 10 | — | — | — | — | — |
| | II. Carboxylic acid Silica, Example 65 | — | 7.5 | — | — | — | — |
| | III. Carboxylic acid salt Silica, Example 48 | — | — | 5 | — | — | — |
| | IV. Amine Carboxylate Silica, Example 81[1] | — | — | — | 12 | — | — |
| | V. Quaternary Ammonium Compound Silica, Example 27 | — | — | — | — | 30 | — |
| | VI. Hydroxy Compound Silica, Example 96[2] | — | — | — | — | — | 30 |
| | (2) Carbon Black | | | | | | |
| | Statex 125 | 20 | — | — | — | — | — |
| | Statex 160 | — | 22.5 | — | — | — | — |
| | Philblack O | — | — | 22.5 | — | — | — |
| | Thermax | — | — | — | 20 | — | — |
| | (3) Processing Oil Circosol | 1 | — | — | — | 6 | — |
| | (4) Beading Water | 37 | 33 | 32 | 35 | 38 | 31 |
| | (5) Blend (1), (2), (3) and (4), (X) | X | X | X | X | X | X |
| (B) | Beading Blend[3], min. | 1 | 1 | 1 | 1 | 1 | 1 |
| | Laboratory Beader, min. | 3 | 3 | 3 | 3 | 3 | 3 |
| | Beaded, (X) | X | X | X | X | X | X |
| | Beads Dried (105°C.) (X) | X | X | X | X | X | X |

[1] Example 81 after step (D) the tallow-amine oleate treated silica was dried for use in this example.
[2] Example 96 after step (E) the octadecanol treated wet silica was dried for use in this example.
[3] Waring blender, a trademark product.

TABLE XXXIX

Silica Composition Beads Including Water Soluble Polyol Material
(Parts by wt.)

| Examples | | 141 | 142 | 143 | 144 |
|---|---|---|---|---|---|
| (A) | Silica Pigment Slurry | | | | |
| | Alkaline silica pigment-I (pH = 8.5–9.5) | 500 | 500 | 500 | 500 |
| | Dry solids basis | 50 | 50 | 50 | 50 |
| | Water | 550 | 550 | 550 | 550 |
| (B) | Reactant-Aqueous Solution | | | | |
| | 2% Sulfuric acid | 90 | 90 | — | — |
| | 2% Calcium chloride | — | — | 110 | — |
| | 2% Aluminum sulfate | — | — | — | 175 |
| (C) | Treated Silica Pigment | | | | |
| | Blend (A) and (B), (X) | X | X | X | X |
| | (1) Filter and wash,(X) | X | X | X | X |
| (D) | Water Soluble Polyol Materials | | | | |
| | Ethylene glycol | 1 | — | — | — |
| | Diethylene glycol | — | 1 | — | — |
| | Propylene glycol | — | — | 1.5 | — |
| | Triethanol amine | — | — | — | 1.2 |
| (E) | Combine (C) and (D) | | | | |
| | Blend, (X) | X | X | X | X |
| | Dried (105°D.), (X) | X | X | X | X |
| | Micropulverize | X | X | X | X |
| Example | | ;4; | ;42 | ;43 | ;44 |
| (F) | Pigment and Water | | | | |
| | Silica (E) | 25 | 25 | 25 | 25 |
| | Water | 31 | 117 | 90 | 115 |
| | Statex 125[1] | — | 75 | 50 | 75 |
| (G) | Preparation Oil Emulsion | | | | |
| | Circosol 2XH[2] | 5 | 15 | — | — |
| | Water | 5 | 15 | — | — |
| | Oleic acid | 0.1 | 0.3 | — | — |
| | 28% Aqueous ammonia | 0.1 | 0.3 | — | — |
| | Emulsify, (X) | X | X | — | — |

TABLE XXXIX — Continued

Silica Composition Beads
Including Water Soluble Polyol Material
(Parts by wt.)

| Examples | | 141 | 142 | 143 | 144 |
|---|---|---|---|---|---|
| (H) | Beading (Blend (F) and (G)) | | | | |
| | Blend, min. | 1 | 1 | 1 | −1 |
| | Laboratory beader, min. | 3 | 3 | 3 | 3 |
| | Beaded, (X) | X | X | X | X |
| | Beads dried (105°C.), (X) | X | X | X | X |

[1] Carbon black, a trademark product.
[2] Processing oil, a trademark product.

The masterbatches prepared in accordance with the present invention may be compounded with vulcanizing ingredients and vulcanized by any suitable recipe (e.g., the recipe set forth in Table I, above) to form useful vulcanizates.

From the foregoing disclosure, it will be appreciated, inter alia, that the present invention improves elastomer-silica pigment masterbatches by employing silica pigments combined with specified materials to improve the compatability of the said pigments with elastomer materials in general.

In certain co-pending applications filed concurrently herewith, different modes of improving elastomer-silica pigment masterbatches are provided by employing elastomers supplied with certain substituent groups improving the compatability of the elastomers with the aqueously wet silica pigments.

To maintain clear lines of division between the co-pending applications, the claims of this applications recite, and rely for patentability on, only its own improvements, without prejudice to their applicability to processes or products employing such improvements along with a different improvement disclosed in one of said co-pending applications.

Also while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for preparing pigment composition which comprises, in combination:
   a. providing 10 weight parts, dry basis, of aqueously wet hydrated silica pigment precipitate which has a bound alkali content in the range of 0.1 to 10 percent by weight as $Na_2O$; which has been prepared by precipitation from an aqueous solution of alkali metal silicate with the aid of carbon dioxide; and which has continuously been maintained in an aqueously wet state without having been dried therefrom after its precipitation;
   b. providing from 0.1 to 2 weight parts, dry basis, of oleophilic material selected from the class consisting of the members of the following groups: (I) the oleophilic amines; (II) the oleophilic carboxylic acids and their alkali metal and ammonium salts; (III) the oleophilic carboxylic acid salts of aluminum, zinc, the alkaline earth metals, and such with ammonium hydroxide; (IV) the oleophilic amine carboxylates; (V) the oleophilic quaternary ammonium compounds; (VI) the oleophilic hydroxy compounds; (VII) the combinations of 2 or more members of the foregoing groups; and from 0 to 1 weight part of polyol dry basis;
   c. providing from 0 to 180 weight parts, dry basis, of carbon black;
   d. providing from 0 to 45 percent based on the total of (a) and (c) dry basis, by weight of processing oil;
   e. replacing from 0 to 100 percent of the alkalinity of the wet pigment provided in (a) by reaction with reactant selected from the class consisting of members of the following groups: Group (I) the water soluble salts of aluminum or zinc; Group (II) the water soluble salts of alkaline earth metals; Group (III) the water soluble acids; Group (IV) combinations of 2 or more members selected from Groups (I), (II) or (III); and
   f. combining the pigment provided by step (e) with the material provided by steps (b), (c) and (d) to provide the pigment composition.

2. A process as claimed in claim 1, wherein
   g. following step (f) the pigment composition is dried.

3. A process as claimed in claim 1, wherein
   g. following step (f) the pigment composition is beaded and dried.

4. A process as claimed in claim 3, wherein step (f) is practiced in two parts, the pigment from one part of step (f) being supplied to step (g) in the still aqueously wet state, and the pigment from the other part of step (f) being at least partially dried and being supplied to step (g) in such dried state, the weight ratio of the wet and dried silica pigments being such as to provide a sufficient quantity of water for beading.

5. A pigment composition consisting essentially of the following components, dry basis by weight, distributed throughout the composition:
   a. 10 weight parts, dry basis, of hydrated silica pigment which has been prepared by precipitation from an aqueous alkali metal silicate solution with the aid of carbon dioxide, said hydrated silica pigment, prior to its incorporation in the composition having had from 0 to 100 percent of its alkalinity replaced by reaction with reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of 2 or more members selected from Groups (I), (II) and (III) of this class;
   b. from 0.01 to 2 weight parts, dry basis, of oleophilic material selected from the class consisting of the members of the following groups: (I) the oleophilic amines; (II) the oleophilic carboxylic acids and their alkali metal and ammonium salts; (III) the oleophilic carboxylic acid salts of aluminum, zinc, the alkaline earth metals, and such with ammonium hydroxide; (IV) the oleophilic amine carboxylates; (V) the oleophilic quaternary ammonium compounds; (VI) the oleophilic hydroxy compounds; (VII) the combinations of 2 or more members of the foregoing groups;

c. from 0 to 1 weight part, dry basis, of polyol;
d. from 0 to 150 weight parts of carbon black; and
e. from 0 to 45 percent, based on the total of (c) and (d), of processing oil.

6. A pigment composition as claimed in claim 5, said composition being in beaded form.

7. A wet pigment composition consisting essentially of the following components, dry basis by weight, distributed throughout the composition:
 a. 10 weight parts, dry basis, of aqueously wet hydrated silica pigment which has been prepared by precipitation from an aqueous alkali metal silicate solution with the aid of carbon dioxide, said hydrated pigment, prior to its incorporation in the composition, having had from 0 to 100 percent of its alkalinity replaced by reaction with reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of 2 or more members selected from Groups (I), (II) and (III) of this class;
 b. from 0.01 to 2 weight parts, dry basis, of oleophilic material selected from the class consisting of the members of the following groups: (I) the oleophilic amines; (II) the oleophilic carboxylic acids and their alkali metal and ammonium salts; (III) the oleophilic carboxylic acid salts of aluminum, zinc, and the alkaline earth metals, and such with ammonium hydroxide; (IV) the oleophilic amine carboxylates; (V) the oleophilic quaternary ammonium compounds; (VI) the oleophilic hydroxy compounds; (VII) the combinations of 2 or more members of the foregoing groups;
 c. from 0 to 1 weight part of polyol dry basis;
 d. from 0 to 150 parts of carbon black; and
 e. from 0 to 45 percent, based on the total of (c) and (d), of processing oil.

8. A process for preparing pigment composition which comprises, in combination:
 a. providing 10 weight parts, dry basis, of aqueously wet hydrated silica pigment precipitate which has a bound alkali content in the range of 0.1 to 10 percent by weight as $Na_2O$; which has been prepared by precipitation from an aqueous solution of alkali metal silicate with the aid of carbon dioxide; and which has continuously been maintained in an aqueously wet state without having been dried therefrom after its precipitation;
 b. providing from 0.1 to 2 weight parts, dry basis, of oleophilic material selected from the class consisting of the members of the following groups: (I) the oleophilic amines; (II) the oleophilic carboxylic acids and their alkali metal and ammonium salts; (III) the oleophilic carboxylic acid salts of aluminum, zinc, the alkaline earth metals, and such with ammonium hydroxide; (IV) the oleophilic amine carboxylates; (V) the oleophilic quaternary ammonium compounds; (VI) the oleophilic hydroxy compounds; (VII) the combinations of 2 or more members of the foregoing groups; and from 0 to 1 weight part of polyol dry basis;
 c. providing from 0 to 30 weight parts, dry basis, of carbon black;
 d. providing from 0 to 16 weight parts of processing oil;
 e. replacing from 0 to 100 percent of the alkalinity of the wet pigment provided in (a) by reaction with reactant selected from the class consisting of members of the following groups: Group (I) the water soluble salts of ammonium or zinc; Group (II) the water soluble salts of alkaline earth metals; Group (III) the water soluble acids; Group (IV) combinations of 2 or more members selected from Groups (I), (II) or (III); and
 f. combining the pigment providing by step (e) with the material provided by steps (b), (c) and (d) to provide the pigment composition.

9. A process as claimed in claim 8, wherein the quantities provided in steps (c) and (d) are respectively 0 parts and at least 5 parts by weight.

10. A pigment composition incorporating the following components, dry basis by weight, distributed throughout the composition:
 a. 10 weight parts, dry basis, of hydrated silica pigment which has been prepared by precipitation from an aqueous alkali metal silicate solution with the aid of carbon dioxide, said hydrated silica pigment, prior to its incorporation in the composition having had from 0 to 100 percent of its alkalinity replaced by reaction with reactant material selected from the class consisting of the members of the following groups: Group (I) the water soluble salts of aluminum or zinc; Group (II) the water soluble salts of the alkaline earth metals; Group (III) the water soluble acids; and Group (IV) combinations of 2 or more members selected from Groups (I), (II) and (III) of this class;
 b. from 0.01 to 2 weight parts, dry basis, of oleophilic material selected from the class consisting of the members of the following groups: (I) the oleophilic amines; (II) the oleophilic carboxylic acids and their alkali metal and ammonium salts; (III) the oleophilic carboxylic acid salts of aluminum, zinc, the alkaline earth metals, and such with ammonium hydroxide; (IV) the oleophilic amine carboxylates; (V) the oleophilic quaternary ammonium compounds; (VI) the oleophilic hydroxy compounds; (VII) the combinations of 2 or more members of the foregoing groups;
 c. from 0 to 1 weight part, dry basis, of polyol;
 d. from 0 to 30 weight parts of carbon black; and
 e. from 0 to 16 weight parts of processing oil.

11. A pigment composition as claimed in claim 10, the quantities of components (d) and (e) being respectively 0 parts and at least 5 parts, by weight.

* * * * *